United States Patent
Watanabe et al.

(10) Patent No.: US 8,274,870 B2
(45) Date of Patent: Sep. 25, 2012

(54) OPTICAL DISK, OPTICAL DISK DEVICE, OPTICAL DISK DEFECT REGISTERING METHOD, OPTICAL DISK RECORDING METHOD, AND OPTICAL DISK REPRODUCING METHOD

(75) Inventors: Katsuya Watanabe, Nara (JP); Shinichi Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/738,983

(22) PCT Filed: Jul. 1, 2009

(86) PCT No.: PCT/JP2009/003058
§ 371 (c)(1),
(2), (4) Date: Apr. 21, 2010

(87) PCT Pub. No.: WO2010/004707
PCT Pub. Date: Jan. 14, 2010

(65) Prior Publication Data
US 2010/0226226 A1    Sep. 9, 2010

(30) Foreign Application Priority Data
Jul. 10, 2008   (JP) .................... 2008-179855

(51) Int. Cl.
*G11B 7/00*    (2006.01)
(52) U.S. Cl. ............... 369/53.17; 369/47.14; 369/53.15; 369/47.44
(58) Field of Classification Search ............... 369/53.16, 369/53.17, 53.15, 30.04, 47.1, 94; 714/6.12; 430/270.11; 386/126; 359/3
See application file for complete search history.

(56) References Cited

U.S. PATENT DOCUMENTS

| | | | | |
|---|---|---|---|---|
| 4,833,665 A * | 5/1989 | Tokumitsu et al. | ......... | 369/53.17 |
| 5,418,767 A * | 5/1995 | Gaudet et al. | ............ | 369/53.16 |
| 7,188,271 B2 * | 3/2007 | Park et al. | ............... | 714/6.12 |
| 7,624,299 B2 * | 11/2009 | Park et al. | ............... | 714/6.12 |
| 2004/0190406 A1 * | 9/2004 | Hwang et al. | ............... | 369/47.1 |
| 2007/0122124 A1 * | 5/2007 | Park et al. | ................. | 386/126 |
| 2007/0177468 A1 * | 8/2007 | Miyashita et al. | ........ | 369/30.04 |
| 2007/0253306 A1 | 11/2007 | Takahashi et al. | | |
| 2007/0259288 A1 * | 11/2007 | Yokoyama | ............ | 430/270.11 |
| 2008/0068685 A1 * | 3/2008 | Takeyama | ............... | 359/3 |
| 2009/0059761 A1 | 3/2009 | Watanabe et al. | | |
| 2009/0122682 A1 * | 5/2009 | Hwang | .................... | 369/94 |

(Continued)

FOREIGN PATENT DOCUMENTS

EP    2 073 208 A1    6/2009

(Continued)

OTHER PUBLICATIONS

Search Report for corresponding International Application No. PCT/JP2009/003058 mailed Sep. 29, 2009.

(Continued)

*Primary Examiner* — Thuy Pardo
(74) *Attorney, Agent, or Firm* — Renner, Otto, Boisselle & Sklar, LLP

(57) ABSTRACT

An optical disc according to the present invention has a first defect management area to which first defect management information corresponding to non-permanent defects is added, and a second defect management area to which second defect management information corresponding to permanent defects is added. The second defect management information added to the second defect management area is non-rewritable.

16 Claims, 26 Drawing Sheets

U.S. PATENT DOCUMENTS

2010/0085852 A1* 4/2010 Park et al. .................. 369/53.17

FOREIGN PATENT DOCUMENTS

| JP | 06-150575 | 5/1994 |
|----|-----------|--------|
| JP | 07-147065 | 6/1995 |
| JP | 08-036846 | 2/1996 |
| JP | 09-055035 | 2/1997 |
| JP | 2000-222831 | 8/2000 |
| JP | 2003-099923 | 4/2003 |
| WO | 2006/038633 A1 | 4/2006 |
| WO | 2008/041700 A1 | 4/2008 |

OTHER PUBLICATIONS

Form PCT/ISA/237 and partial English translation for International Application No. PCT/JP2009/003058.

Co-pending U.S. Appl. No. 12/578,644, filed Oct. 14, 2009.

Co-pending U.S. Appl. No. 12/739,973, filed Apr. 27, 2010.

* cited by examiner

FIG. 8

| | RANGE OF DISTURBANCE | VISIBLE? | VARIATION IN REFLECTED LIGHT INTENSITY | ERROR RATE | ABNORMAL TRACK JUMP |
|---|---|---|---|---|---|
| DUST | NON-DETERMINABLE BUT BROAD | YES | LITTLE | × | △ |
| DIRT | 1mm~2mm | EASILY VISIBLE | GREAT | ○ CORRECTIBLE | ○ |
| FINGERPRINT | 5mm~20mm | YES | GREAT | × | ○ |
| BUBBLE | 1mm~2mm | NO | LITTLE | × | × |
| SCRATCH | NON-DETERMINABLE BUT NARROW 1mm or less | YES | GREAT | ○ CORRECTIBLE | △ |

FIG. 16

| Flag | Defect | Start PSN | END PSN | PC FILE WRITABLE? | AV FILE WRITABLE? |
|---|---|---|---|---|---|
| 1 | Bubble1 | 0614h | 0705h | ○ | ○ |
| 1 | Bubble2 | 1103h | 1208h | ○ | ○ |
| 1 | Bubble3 | 1718h | 1850h | ○ | ○ |
| 1 | Bubble4 | | | | |
| 1 | Bubble5 | | | | |
| | | | | | |
| 0 | F-Pront1 | 9040h | 150106h | × | ○ |
| 0 | F-Pront2 | 281036h | 362810h | × | ○ |
| 0 | F-Pront3 | | | | |
| 0 | F-Pront4 | | | | |
| 0 | F-Pront5 | | | | |
| | | | | | |
| 0 | BDO1 | 5963h | 8782h | × | ○ |
| 0 | BDO2 | | | | |
| 0 | BDO3 | | | | |
| | | | | | |
| | | | | | |

*FIG. 17*

| | HOST | DRIVE |
|---|---|---|
| 1 | ISSUE PC FILE WRITE COMMAND FOR FILE #1 | |
| 2 | | REFER TO LIST OF PERMANENT DEFECTS (OR LIST OF BUBBLES) |
| 3 | | EXPAND LOGICAL ADDRESSES AND CONVERT THEM INTO PHYSICAL ONES EXCEPT IN AREAS WITH BUBBLES (START AND END PSN) |
| 4 | | GO TO WRITING START ADDRESS AND GET WRITING STARTED |
| 5 | | FINISH WRITING |
| 6 | ISSUE PC VERIFY COMMAND | |
| 7 | | GO TO WRITING START ADDRESS AND START VERIFICATION |
| 8 | | FINISH THE VERIFICATION |
| 9 | ISSUE PC FILE WRITE COMMAND FOR FILE #2 | |
| 10 | | GO TO WRITING START ADDRESS AND GET WRITING STARTED |
| | | BUT TRACKING ERROR IS GENERATED DURING WRITING |
| 11 | INSTRUCT THE DRIVE TO CONTINUE WRITING ON REPLACEMENT AREA AS RECOVERY | |
| 12 | | RETAIN ERROR GENERATION ADDRESS TEMPORARILY |
| | | GO TO REPLACEMENT WRITING START ADDRESS AND GET THE WRITE OPERATION STARTED |
| | | FINISH THE WRITE OPERATION |
| 13 | ISSUE PC VERIFY COMMAND | |
| 14 | | GO TO WRITING START ADDRESS, START VERIFICATION AND THEN VERIFY THE REPLACEMENT AREA, TOO |
| 15 | | FINISH THE VERIFICATION |
| 16 | GET EVERYTHING WRITTEN (ISSUE TURN OFF COMMAND) | |
| 17 | | GO TO ERROR GENERATION ADDRESS, MAKE DEFECT SEARCH |
| | | AND RECOGNIZE THE DEFECT TO BE FINGERPRINT |
| | | ADD INFORMATION TO DEFECT LIST AND NOTIFY THE USER OF THE END OF DEFECT SEARCH |
| 18 | ENTER READY STATE OR SWITCH POWER OFF | |

FIG. 18

| | HOST | DRIVE |
|---|---|---|
| 1 | ISSUE AV FILE WRITE COMMAND FOR FILE #1 | |
| 2 | | REFER TO LIST OF PERMANENT AND NON-PERMANENT DEFECTS (INCLUDING BUBBLES, FINGERPRINTS AND BODS) |
| 3 | | EXPAND LOGICAL ADDRESSES AND CONVERT THEM INTO PHYSICAL ONES WITH EVERY DEFECTIVE AREA AVOIDED (START AND END PSN) |
| | | GO TO WRITING START ADDRESS AND GET WRITING STARTED |
| 4 | | FINISH WRITING |
| 5 | ISSUE AV FILE WRITE COMMAND FOR FILE #2 | |
| 6 | | GO TO WRITING START ADDRESS AND GET WRITING STARTED |
| 7 | | TRACKING ERROR IS GENERATED DURING WRITING AND NOTIFY USER OF THAT |
| 8 | INSTRUCT THE DRIVE TO AVOID WRITING TO THAT AREA | |
| 9 | | CONTINUE WRITING WITH DEFECTIVE SECTORS SKIPPED AND GET WRITING DONE |
| 10 | | GO TO ERROR GENERATION ADDRESS, MAKE DEFECT SEARCH |
| | | AND RECOGNIZE THE DEFECT TO BE FINGERPRINT |
| | | ADD INFORMATION TO LIST OF NON-PERMANENT DEFECTS (FINGERPRINTS) AND NOTIFY THE USER OF THE END OF DEFECT SEARCH |
| 11 | ENTER READY STATE OR SWITCH POWER OFF | |

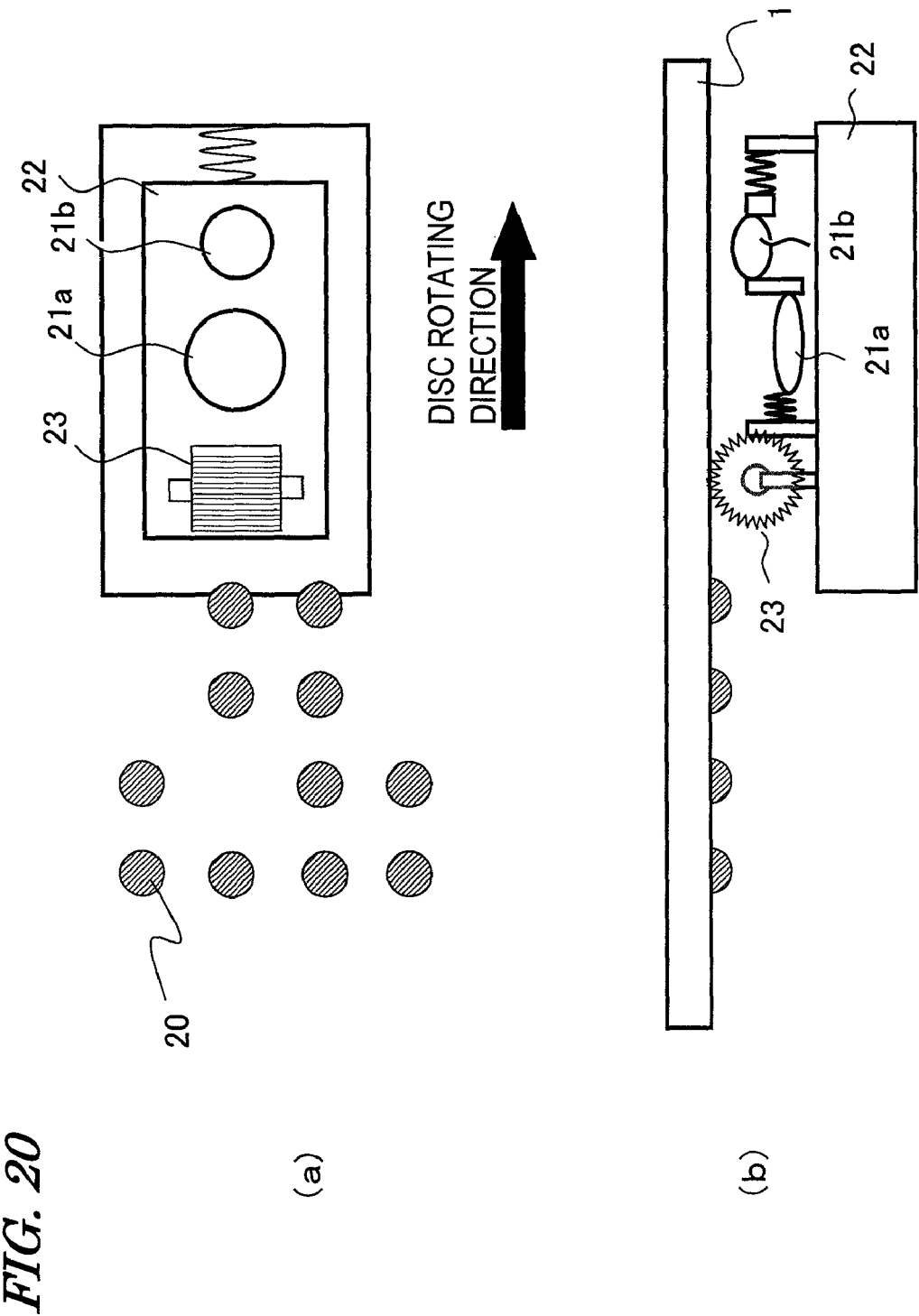

*FIG. 23*

| | | | Bits |
|---|---|---|---|
| Access control Area | ID (SPECIFIC TYPE) | | 1 bit |
| | NUMBER OF TIMES OF UPDATE | | 3 bits |
| | WRITE PROTECT AND ACCESS CONTROL | L0WAPF | 2bits (00) |
| | | L1WAPF | 2bits (01) |
| | | L2WAPF | 2bits (00) |
| | | ⋮ | |
| | | L15WAPF | 2bits (10) |
| | | L16WAPF | 2bits (00) |
| | | ⋮ | |
| | | L31WAPF | 2bits (00) |
| | TYPE-BY-TYPE DEFECT REGISTERING AREA | (FIG. 13) | |

FIG. 24
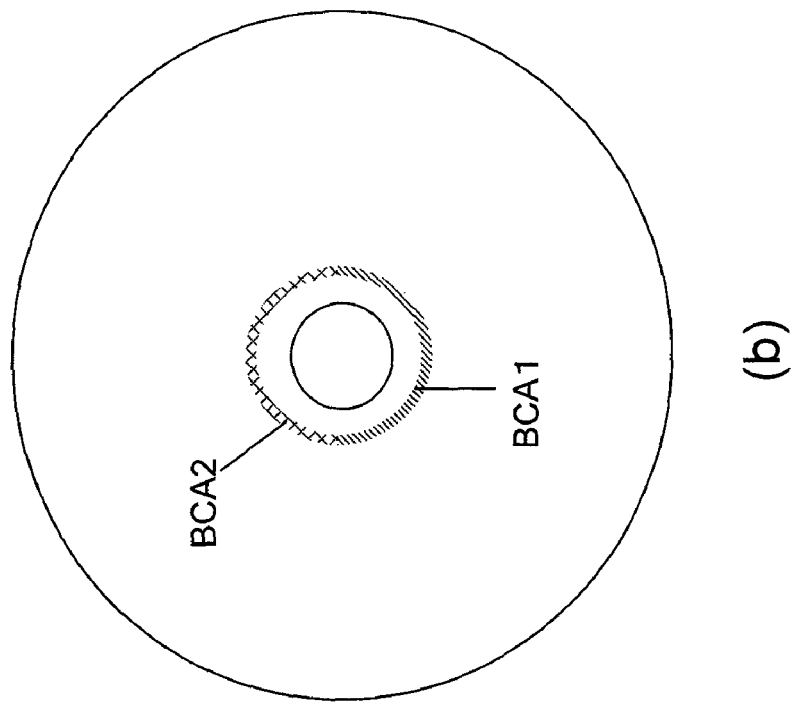
(b)
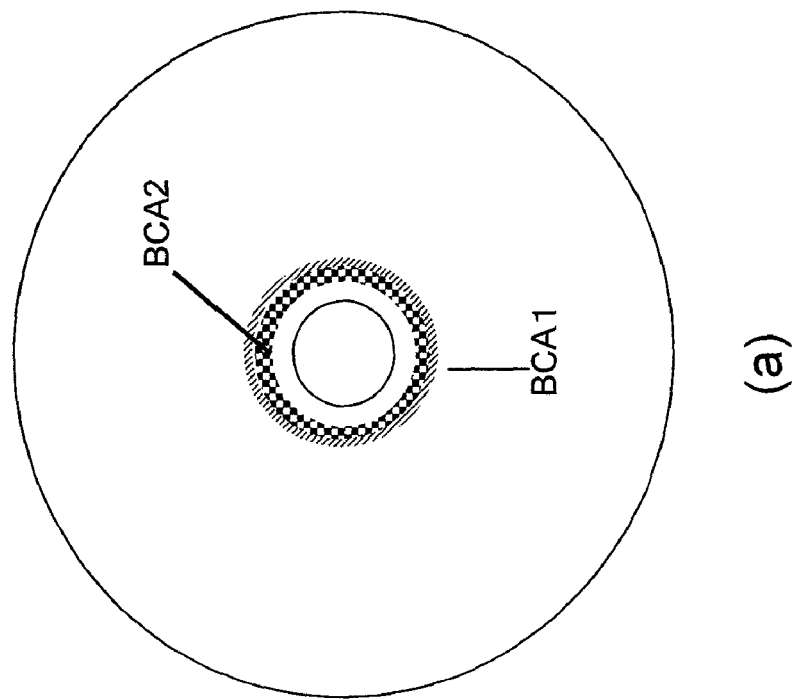
(a)

ively only on
OPTICAL DISK, OPTICAL DISK DEVICE, OPTICAL DISK DEFECT REGISTERING METHOD, OPTICAL DISK RECORDING METHOD, AND OPTICAL DISK REPRODUCING METHOD

TECHNICAL FIELD

The present invention relates to an optical disc, an optical disc apparatus, an optical disc defect registering method, and methods for reading and writing from/to an optical disc. More particularly, the present invention relates to an optical disc technology that uses a blue-violet laser light source with as high an NA (numerical aperture) as 0.85 or more and a wavelength of 405 nm.

BACKGROUND ART

As described in Patent Document No. 1, as for a DVD-RAM, each and every area of the optical disc is certified as defect free by the manufacturer of the optical disc when the disc is going to be shipped. Such an optical disc is shipped with the result of such certification recorded on the defect management area (DMA) of the optical disc. And when the user purchases that optical disc and writes data on it using an optical disc apparatus (or optical disc drive), the optical disc apparatus determines, by reference to the information stored in such a DMA, whether each area of the optical disc is recordable or not, and then writes data selectively only on recordable areas.

CITATION LIST

Patent Literature
  Patent Document No. 1: Japanese Patent Application Laid-Open Publication No. 2000-222831

SUMMARY OF INVENTION

Technical Problem

According to the conventional optical disc technologies such as the one disclosed in Patent Document No. 1, various types of defects on an optical disc, including fingerprints, dirt, scratches, brazes, and dust, are not distinguished from each other. More specifically, if the jitter increases in a certain area during a verification process after data has been written on an optical disc (i.e., during a "write verification process"), then the presence of some "defect" in that area is detected. That is to say, no matter what type of defect has been encountered, a replacement area is automatically secured indifferently for any defect to register. And if every replacement area has been used up as a result of increase in the number of defects with a long-term use, for example, then write protect processing is carried out to prevent the collapse of the system. As can be seen, such a defect management method in which removable defects such as fingerprints and dirt (which will be referred to herein as "non-permanent defects") and non-removable defects such as scratches (which will be referred to herein as "permanent defects") are regarded as no different from each other, is far from being an efficient defect management method.

Blu-ray Discs (BDs), which have become increasingly and immensely popular these days as next-generation optical discs to replace DVDs in the near future, are actually much more sensitive to scratches, dirt and fingerprints than CDs and DVDs are. Nevertheless, BDs have been standardized as bare optical discs. That is why when a brand-new BD is removed from its case and loaded into a drive, very small fingerprints are easily left on it unintentionally. And if there are fingerprints on a BD that has been loaded into the drive, unwanted track jumps or verification errors (increase in jitter) could happen.

It is already known that a BD associated with a higher NA is significantly affected by a bubble that has been trapped between a storage layer and a protective layer. Such a bubble is a large-scale defect. If a number of bubbles were produced in a single BD, replacement areas would be consumed rapidly. And if defects should be registered so frequently, replacement areas would be used up quickly. Particularly in a harsh environment in which it is not easy to replace a BD with defects with a brand-new BD (e.g., outdoors or in a car), the write operation would stop easily due to some defect that has been produced on the disc surface while the BD is being used, which is a serious problem.

Currently, manufacturers of BDs are making a strict quality control on BDs to be shipped so that the BDs satisfy tight specifications. That is why a lot of BDs will fail to meet such rigid specifications and be disposed of as defective ones, thus lowering the production yield and eventually keeping the manufacturers from lowering the retail price. For that reason, to lower the unit price of BDs, it is effective to relax the specifications and increase the production yield instead.

It is therefore an object of the present invention to provide an optical disc, an optical disc apparatus, an optical disc defect registering method, an optical disc writing method and an optical disc reading method that will contribute to getting appropriate countermeasures done according to the type of the defect encountered.

Solution to Problem

An optical disc according to the present invention has a data area and a management area. The management area includes a defect management area to store defect attribute information, by which it can be determined whether a defect detected is a permanent defect or a non-permanent defect, and defect location information indicating the location of the defect.

In one preferred embodiment, the content of the defect attribute information varies according to the attribute or type of the defect.

In another preferred embodiment, the defect attribute information includes information indicating the specific type of the defect.

In still another preferred embodiment, the defect attribute information is already stored in the defect management area when the optical disc is shipped.

In yet another preferred embodiment, the defect attribute information includes: a first kind of defect attribute information indicating that the defect is a non-permanent defect; and a second kind of defect attribute information indicating that the defect is a permanent defect.

In yet another preferred embodiment, the permanent defect includes a bubble that has been produced inside the optical disc, and the non-permanent defect includes a fingerprint or dust that is present on the surface of the optical disc.

In this particular preferred embodiment, the permanent defect includes a scratch that has been made on the surface of the optical disc.

Another optical disc according to the present invention includes N information storage layers (where N is an integer that is equal to or greater than three and) that are stacked one upon the other. If any of the N information storage layers has permanent defects in at least a predetermined number or in at least a predetermined percentage, no data may be written on that information storage layer. Information identifying that information storage layer, on which no data may be written, is stored on the optical disc.

Still another optical disc according to the present invention includes N information storage layers (where N is an integer that is equal to or greater than three and) that are stacked one upon the other. If any of the N information storage layers has permanent defects in at least a predetermined number or in at least a predetermined percentage and if the number of information storage layer(s) with those permanent defects is X (which is an integer that is equal to or greater than one), no data may be written on such information storage layer(s), having the permanent defects in at least the predetermined number or in at least the predetermined percentage, and the optical disc is sold as having (N−X) information storage layers.

In one preferred embodiment, information identifying such information storage layers, on which no data may be written, is stored either on the surface or the inside of the disc.

An optical disc defect registering method according to the present invention includes the steps of: (A) detecting a defect from an optical disc and determining the attribute or type of the defect detected; and (B) writing defect attribute information, by which it can be determined whether the defect is a permanent defect or a non-permanent defect, along with defect location information indicating the location of the defect, on the optical disc.

In one preferred embodiment, the attribute information is used to determine whether the defect is a permanent defect or a non-permanent defect.

In another preferred embodiment, the attribute information includes information indicating the specific type of the defect.

In still another preferred embodiment, the step (B) includes the steps of: if the defect has turned out to be a non-permanent defect, writing a first kind of defect management information, including a first kind of defect attribute information indicating that the defect is a non-permanent defect, and defect location information indicating the location of the defect on a defect management area of the optical disc; and if the defect has turned out to be a permanent defect, writing a second kind of defect management information, including a second kind of defect attribute information indicating that the defect is a permanent defect, and defect location information indicating the location of the defect on the defect management area of the optical disc.

In this particular preferred embodiment, the optical disc is a write-once optical disc, and the first kind of defect management information, indicating that the defect is a non-permanent one, is added, but the second kind of defect management information, indicating that the defect is a permanent one, is not added, to a temporary defect list (TDFL) in an update unit of a TDMS.

In an alternative preferred embodiment, the second kind of defect management information is non-rewritable.

In yet another preferred embodiment, the step (A) or (B) is performed before the optical disc is shipped.

In yet another preferred embodiment, the step (A) includes recognizing the type of the defect based on a reflected light intensity, a read error rate and a tracking error.

An optical disc data processing method according to the present invention is designed to perform at least one type of processing that are/is writing data on an optical disc and/or reading data from the optical disc. The optical disc includes a data area and a management area. The management area includes a defect management area to store defect attribute information, by which it can be determined whether a defect detected from the optical disc is a permanent defect or a non-permanent defect, and defect location information indicating the location of the defect. The method includes the steps of: retrieving the defect attribute information and the defect location information from the management area; and performing the at least one type of processing with a permanent defect, which is present at the location indicated by the location information, avoided.

An optical disc apparatus according to the present invention is designed to perform at least one type of processing that are/is writing data on an optical disc and/or reading data from the optical disc. The optical disc includes a data area and a management area. The management area includes a defect management area to store defect attribute information, by which it can be determined whether a defect detected from the optical disc is a permanent defect or a non-permanent defect, and defect location information indicating the location of the defect. The apparatus includes: an optical pickup for accessing the optical disc optically; means for getting data read from the optical disc by the optical pickup; and means for performing the at least one type of processing with a permanent defect, which is present at the location indicated by the location information that has been retrieved from the management area of the optical disc, avoided.

In one preferred embodiment, the optical disc apparatus further includes a cleaning mechanism for removing the non-permanent defects. If the apparatus has sensed, by reference to the defect attribute information that has been retrieved from the management area of the optical disc, that the optical disc has at least a predetermined number of non-permanent defects, the cleaning mechanism cleans off the non-permanent defects.

In another preferred embodiment, the optical disc apparatus further includes a display that displays an alert for the user of the apparatus. If the apparatus has sensed, by reference to the defect attribute information that has been retrieved from the management area of the optical disc, that the optical disc has at least a predetermined number of non-permanent defects, the apparatus gets an alert prompting the user to remove the non-permanent defects displayed on the display.

A system according to the present invention includes an optical disc apparatus according to any of the preferred embodiments of the present invention described above and means for getting data written on the optical disc by the optical pickup. In writing audiovisual file data on the optical disc, the data is written on the optical disc with the permanent and non-permanent defects both avoided. In writing PC file data on the optical disc, the data is written on the optical disc with the permanent defects avoided.

Advantageous Effects of Invention

An optical disc according to the present invention includes a defect management area to store defect attribute information, by which it can be determined whether a defect detected is a permanent defect or a non-permanent defect, and defect location information indicating the location of the defect. That is why an optical disc apparatus loaded with the optical disc of the present invention can perform the best type of processing depending on whether a defect on the optical disc is a permanent one or not. For example, if the defect is a non-permanent defect such as a fingerprint, cleaning may be done to remove that defect or the processing of requesting the user to wipe the fingerprint away may be carried out.

In addition, according to the present invention, depending on whether the defect is a permanent one or not, writing or access to a particular one of multiple information layers included in a multilayer optical disc may be prohibited.

Furthermore, according to the present invention, if a multilayer optical disc with three or more information layers includes a particular information layer, of which the number or the percentage of permanent defects exceeds a predetermined value (which will be referred to herein as a "defective information layer"), then such an optical disc may be sold so that the user is prohibited from accessing that defective information layer or even noticing the presence of such a defective information layer. For example, if an optical disc with 16 information layers has two defective information layers, then such an optical disc may be sold as a fourteen-layer optical disc.

BRIEF DESCRIPTION OF DRAWINGS

Portion (a) of FIG. 1 is a schematic representation of an optical disc with bubbles 11 and portion (b) of FIG. 1 is an enlarged view thereof showing a relation between the bubbles and tracks.

FIG. 8 is a table summarizing how various defects on a BD will affect the AS and TE signals.

FIG. 16 is an example of a defect list.

FIG. 17 is a table summarizing how the drive will operate in response to a command that has been sent from the host to the drive in writing a PC file.

FIG. 18 is a table summarizing how the drive will operate in response to a command that has been sent from the host to the drive in writing an AV file.

FIG. 20(a) is a plan view illustrating the configuration of an optical pickup with a cleaner and FIG. 20(b) is a cross-sectional view thereof.

FIG. 23 shows the arrangement of the access control area shown in FIG. 22.

FIGS. 24(a) and 24(b) are plan views illustrating exemplary arrangements of BCA areas on a multilayer BD.

DESCRIPTION OF EMBODIMENTS

Before preferred embodiments of the present invention are described, a bubble and a large-scale defective area formed by the bubble will be described first in detail.

Figure 1:
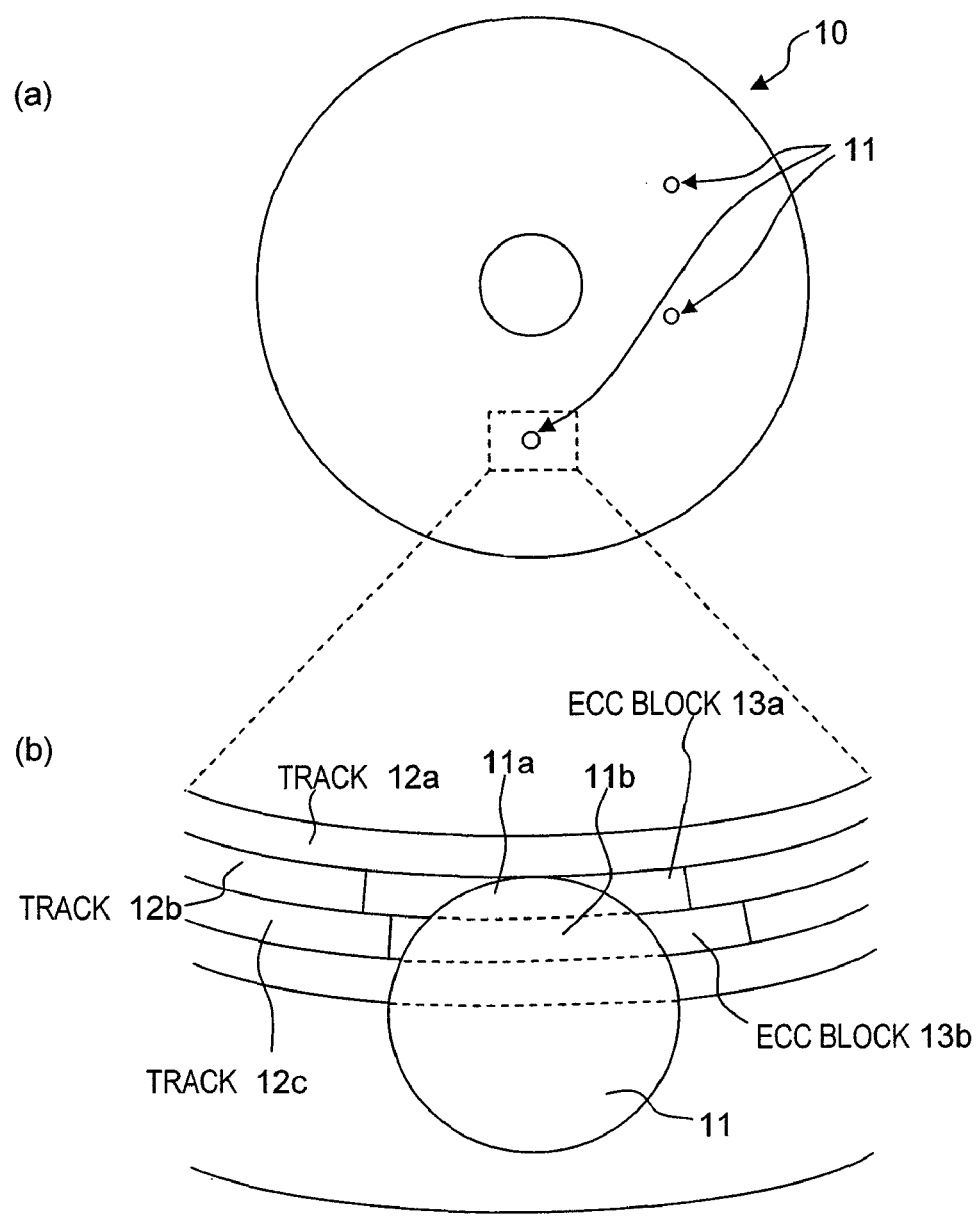

Portion (a) of FIG. 1 schematically illustrates the surface of a BD 10 as an optical disc with bubbles 11. In portion (a) of FIG. 1, the bubbles 11 are illustrated as visible ones to let the reader understand more easily how the present invention works. Actually, however, there are some invisible bubbles, too.

A bubble typically has a size (diameter) of approximately 500 μm to approximately 1,000 μm. If a bubble were produced between the information layer of a BD and the light transmissive layer thereof, the surface of the light transmissive layer would be raised locally because the light-transmissive layer has as small a thickness as approximately 100 μm. Almost no reflected light returns from the center (or the core) of the bubble but the light beam is not transmitted normally through the raised portion surrounding the bubble, either. The objective lens for use to perform a read/write operation on a BD has a high numerical aperture NA and forms a focal point on a shallow information layer under the surface of the disc. That is why even if the light transmissive layer were warped only slightly, the spherical aberration would change significantly and the intensity of the reflected light would vary easily.

Such a bubble could also be produced in a multilayer disc with multiple information layers that are stacked one upon the other. Hereinafter, it will be described what problem would arise if a bubble were produced in a multilayer disc.

FIGS. 2(a) and 2(b) schematically illustrate the cross section of a single-layer disc and that of a dual-layer disc that has two information layers, respectively. In the single-layer disc shown in FIG. 2(a), a first information layer L0 thereof is covered with a light transmissive layer 56 with a thickness of approximately 100 μm. In the dual-layer disc shown in FIG. 2(b), a first information layer L0 thereof is covered with a light transmissive layer 52 with a thickness of approximately 25 μm and a second information layer L1 thereof is covered with a light transmissive layer 54 with a thickness of approximately 75 μm. In the single-layer disc shown in FIG. 2(a), a bubble 11 has been produced between the first information layer L0, which is located at a depth of approximately 100 μm under the surface of the optical disc, and the light transmissive layer 56. On the other hand, in the dual-layer disc shown in FIG. 2(b), a bubble 11 has been produced between the first information layer L0, which is located at a depth of approximately 100 µm under the surface of the optical disc, and the light transmissive layer 52.

As shown in FIG. 2(b), if the bubble 11 got trapped between the optical disc substrate 50 of the dual-layer disc and the first information layer L0 thereof, the raised portion surrounding the bubble 11 would affect the second information layer L1, too, because the space between the first and second information layers L0 and L1 is just 25 µm.

Likewise, even in a four-layer disc with four information layers, if a bubble 11 were produced in the vicinity of the first information layer L0 thereof, every other information layer would also be affected as shown in FIG. 2(c).

The present inventors discovered via experiments that no matter how deep under the surface of a multilayer disc a bubble 11 was produced, every information layer of that optical disc was affected by the bubble 11. Hereinafter, the reason will be described with reference to FIGS. 3(a) through 3(c).

Figure 3:
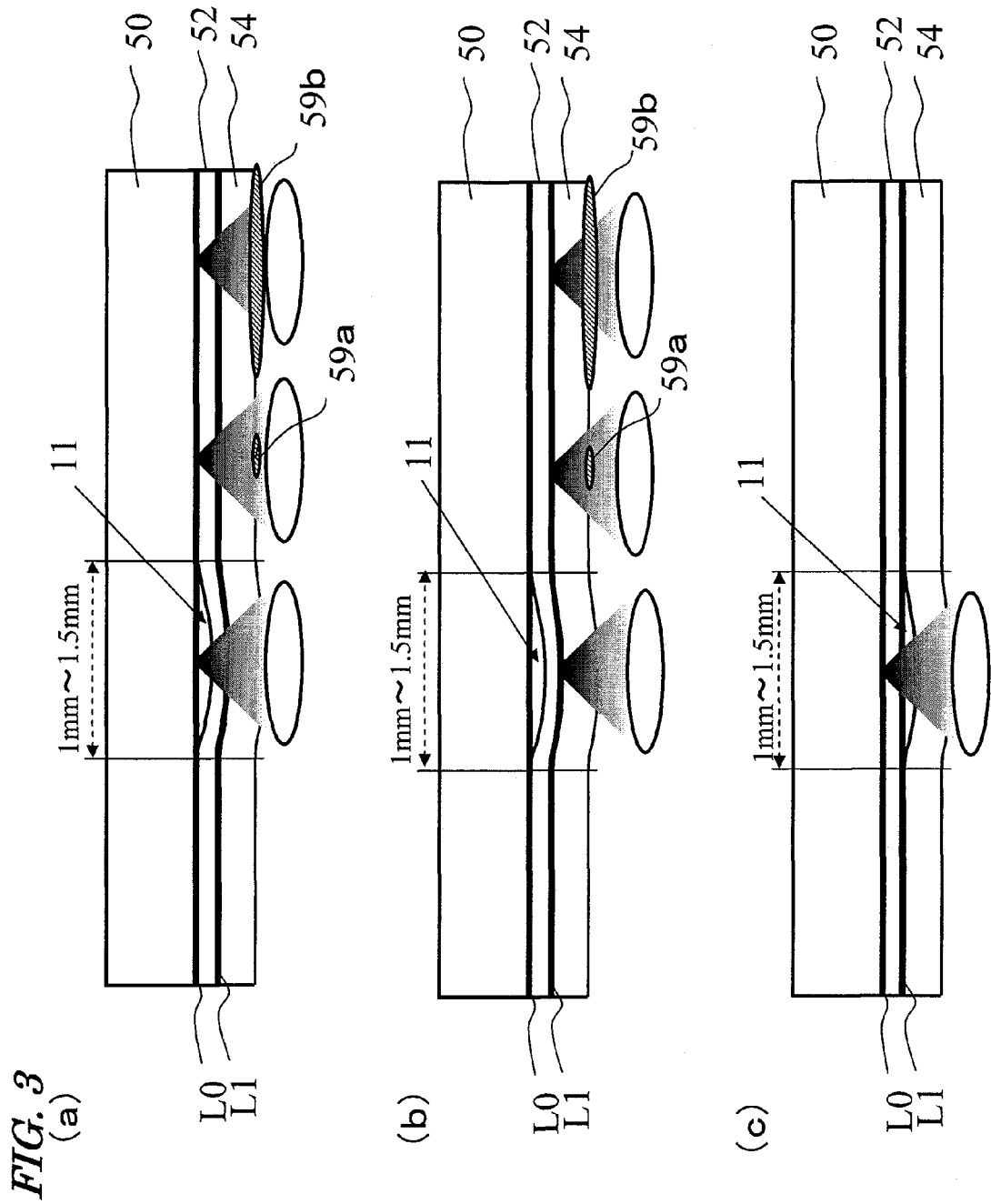
FIGS. 3(a), 3(b) and 3(c) are schematic cross-sectional views illustrating how a bubble affects a dual-layer disc.

As shown in FIG. 3(a), in a situation where a bubble 11 is present between the first information layer L0 and the light transmissive layer 52, when a light beam is focused on the first information layer L0, the light beam will cross a raised portion (with a diameter of 1 mm to 1.5 mm) of the light transmissive layer 54, which has been formed by the bubble 11. When a light beam passes through such a raised portion on the surface of an optical disc, the refraction direction will deviate in that raised portion. As a result, a "pseudo-component" (to be described later) will be produced in a tracking signal to be generated based on the light reflected from the information layer. It will be described in detail later exactly what harmful effects the pseudo component would produce.

On the other hand, even when the light beam is focused on the second information layer L1 of the optical disc shown in FIG. 3(a), the light beam will also cross the raised portion of the light transmissive layer 54 that has been formed by the bubble 11 as shown in FIG. 3(b). As a result, the pseudo-component will also be produced in the tracking signal.

Furthermore, in a situation where a bubble 11 is present between the second information layer L1 and the light transmissive layer 54, even when a light beam is focused on the first information layer L0, the light beam will also produce the pseudo-component in the tracking signal as shown in FIG. 3(c) when crossing the raised portion of the light transmissive layer 54 that has been formed by the bubble 11.

As described above, no matter how deep the bubble 11 is located, when the light beam passes through an area that is defined by projecting the bubble 11 perpendicularly to each of the multiple information layers L0 and L1 (which will be sometimes referred to herein as a "bubble area"), some abnormality will arise in the tracking signal and other signals.

Next, suppose there are some surface defects 59a and 59b such as scratches or dust on the surface of the optical disc. If there is a defect 59a, of which the size is smaller than the diameter of the light beam on the surface of the optical disc, then the light beam being transmitted is partially cut off by that defect 59a. As a result, no matter which of the two information layers L0 and L1 the light beam is now being focused on, a decrease in the intensity of the light reflected from the information layer L0 or L1 is seen in both cases. However, the degree of the decrease in light intensity depends on the percentage of the area of the surface defect 59a to the cross section of the light beam on the surface of the optical disc. For example, if the numerical aperture NA is 0.85 and if a light beam spot with a diameter of 0.29 µm is formed on the first information layer L0, the light beam will have a diameter of approximately 140 µm (i.e., 0.14 mm) on the surface of the optical disc.

Comparing FIGS. 3(a) and 3(b) to each other, it can be seen easily that in a situation where the light beam is focused on the information layer L1 that is located closer to the surface of the optical disc, the cross section of the light beam on the surface of the optical disc decreases compared to a situation where the light beam is focused on the more distant information layer L0. That is to say, the diameter of the light beam on the surface of the optical disc changes with the depth of the information layer on which the focal point of the light beam is located. Consequently, the closer to the surface of the optical disc the information layer on which the light beam is now focused, the greater the percentage of the scratch or dust to the cross section of the light beam on the surface of the optical disc.

The results of the experiments the present inventors carried out revealed that in a situation where there was a surface defect 59a on the surface of the optical disc that was too small to find easily with naked eyes, if the focal point of the light beam was set on the information layer L0 that was located more distant from the surface of the optical disc, the influence of a scratch or dust on the decrease in the intensity of the reflected light was negligible. Even so, if the focal point of the light beam was set on the information layer L1 that was located closer to the surface of the optical disc, then the influence of the surface defect 59a on the decrease in the intensity of the reflected light was non-negligible, and errors occurred more easily in reading or writing data from/on the information layer L1.

As can be seen from the foregoing description, the harmful influence of a scratch or dust on the surface of an optical disc will grow if the light beam is focused on an information layer that is located closer to the surface of the optical disc but sometimes may be neglected if the light beam is focused on an information layer that is located more distant from the surface of the optical disc. That is to say, unlike the bubble 11 produced inside an optical disc, the scratch or dust on the surface of the optical disc does not affect every information layer thereof. That is why as far as dust or a scratch is concerned, it is not preferable to regard every perpendicularly projected area on each information layer as a "defective area" and prohibit access to that area without exception.

It should be noted that there could be some surface defect 59b that is bigger than the cross section of the light beam on the surface of the optical disc as shown in FIGS. 3(a) and 3(b). No matter which information layer the light beam is focused on, when the light beam crosses such an extremely big surface defect 59b, the intensity of the reflected light will decrease so significantly that errors will likely to occur in reading or writing data. However, if there is such a big scratch or dust on the surface of the optical disc, that defect can be easily found even with naked eyes, and therefore, such an optical disc itself can be disposed of as a defective product, too.

Unlike such a scratch or dust, a bubble is produced inside an optical disc. As the surface of an optical disc is warped or raised only gently even with a bubble, it is difficult to locate the bubble with naked eyes, although the bubble has influence on a broad range with a diameter of 1 mm to 1.5 mm. Also, it is not preferable to dispose of such an optical disc, in which the bubble has been detected, as a defective product, because it would eventually increase the manufacturing cost of the optical discs.

A bubble may or may not be produced easily according to the type of the manufacturing process of BDs. Specifically, a BD, of which the light transmissive layer has been formed by spin-coating process as described above, tends to have a lot of bubbles. On the other hand, a BD, of which the light transmissive layer has been formed (as a protective sheet) by a bonding process, tends to have a small number of bubbles. It should be noted that bubbles could still be produced by the latter process, too.

Also, according to a normal spin-coating process, bubbles often get trapped between the substrate and the light transmissive layer (information layer) of an optical disc, no matter whether the optical disc is a single-layer disc or a multilayer disc. Meanwhile, in a manufacturing process such as the bonding process, bubbles may get trapped in the spacer layer (light transmissive layer) between the first and second information layers L0 and L1 or in the light transmissive layer that covers the surface of the second information layer L1. Even so, the first information layer L0 through an $n^{th}$ information layer (where n is an integer that is equal to or greater than two) will be affected by the bubbles.

Figure 4:
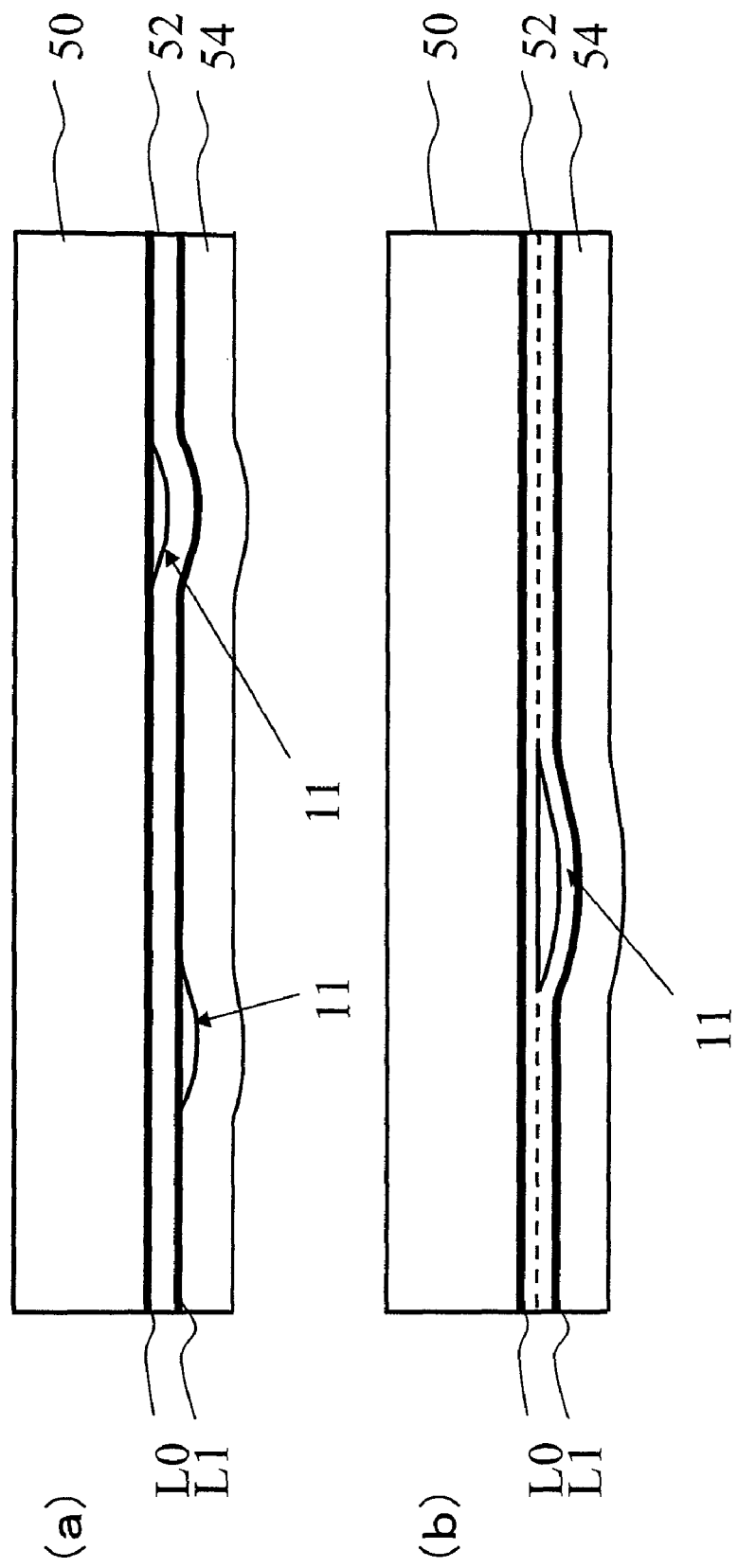
FIGS. 4(a) and 4(b) are schematic cross-sectional views illustrating various locations where bubbles can be produced in a dual-layer disc.

FIG. 4(a) shows a cross section of a dual-layer disc in which bubbles were produced both between the light transmissive layer 52 and the second information layer L1 and between the light transmissive layer 52 and the first information layer L0. On the other hand, FIG. 4(b) shows a cross section of a dual-layer disc in which a bubble was produced inside the light transmissive layer 52. As can be seen easily from FIGS. 4(a) and 4(b), the surface of the optical disc is gently warped and raised, no matter how deep the bubbles were produced. That is why when the light beam crosses such a surface of the optical disc that was warped by the bubbles, the tracking signal always comes to have a pseudo-component irrespective of the depth of the information layer on which the light beam is focused.

Although a bubble 11 may be produced at various depths, the bubble 11 will affect every information layer, no matter how deep the bubble is located as described above. On the other hand, the deeper under the disc surface a target information layer is located (i.e., the greater the depth of that information layer), the smaller the degree and the range of the harmful effect caused by a defect on the disc surface on reading or writing data from/on that information layer. Furthermore, among various kinds of defects on the disc surface, dust, dirt and fingerprints are removable by cleaning, unlike scratches.

The present invention is characterized by determining the mode of a defect management by the type of a defect detected, i.e., carrying out the defect management processing adaptively according to the type or property of that defect.

Embodiment 1

Hereinafter, a Preferred Embodiment of an Optical disc apparatus according to the present invention will be described. In a first specific preferred embodiment of the present invention to be described below, an optical disc is checked for any defect before shipped. An optical disc testing apparatus for checking an optical disc before it is shipped has the same configuration as the optical disc apparatus shown in FIG. 5. The optical disc testing apparatus, however, does not have to have the ability to read/write data from/on the data area of a given optical disc.

Optical Disc Apparatus

Hereinafter, the hardware configuration of an optical disc drive 102 according to this preferred embodiment will be described with reference to FIG. 5, which illustrates an exemplary hardware configuration for the optical disc drive 102 of this preferred embodiment.

The optical disc drive 102 includes an optical disc motor 111, an optical pickup 610, an optical disc controller (ODC) 620, a drive section 625 and a system controller 630. The system controller 630 controls the overall operation of the optical disc drive 102 in accordance with a control program installed.

The optical pickup 610 includes a light source 204, a coupling lens 205, a polarization beam splitter 206, an objective lens 203, a condenser lens 207 and a photodetector 208.

The light source 204 is preferably a semiconductor laser diode, which emits a light beam with a wavelength of 415 nm or less in this preferred embodiment. The light beam emitted from the light source 204 is linearly polarized light, of which the polarization direction can be arbitrarily controlled by turning the light source 204 around the optical axis of the light beam emitted. The coupling lens 205 transforms the light beam that has been emitted from the light source 204 into a parallel beam, which is then incident on the polarization beam splitter 206. The polarization beam splitter 206 has such a property as to reflect linearly polarized light that is polarized in a particular direction but to transmit linearly polarized light that is polarized perpendicularly to that particular direction. The polarization beam splitter 206 of this preferred embodiment is designed so as to reflect the light beam that has been transformed by the coupling lens 205 into the parallel beam toward the objective lens 203.

The light beam that has been polarized toward the objective lens 203 is transmitted through the collimator lens 210 and then incident on the objective lens 203. The collimator lens 210 is driven parallel to the optical axis by a stepping motor (not shown), for example, and can have its spherical aberration adjusted adaptively to each of the multiple layers.

The objective lens 203 converges the light beam that has been reflected by the polarization beam splitter 206, thereby forming a light beam spot on the information layer of the BD 1.

The light beam that has been reflected from the BD 1 is transformed by the objective lens 203 of the optical pickup 610 into a parallel light beam, which is then incident on the polarization beam splitter 206. In this case, the light beam has had its polarization direction rotated 90 degrees with respect to the polarization direction of the light beam that was incident on the BD 1. That is why the light beam is transmitted through the polarization beam splitter 206 and then incident on the photodetector 208 as it is by way of the condenser lens 207.

The photodetector 208 receives the light that has passed through the condenser lens 207 and converts the light into an electrical signal (specifically, a current signal). The photodetector 208 shown in FIG. 5 has its photosensitive plane divided into four areas A, B, C and D, each of which outputs an electrical signal representing the intensity of the light received there.

To have the light beam spot follow the target track on the information layer of the BD 1 that is being turned at a predetermined velocity by the optical disc motor 111, a tracking error (TE) signal representing the magnitude of a tracking error and a focus error (FE) signal representing the magnitude of a focus error need to be monitored based on the light beam that has been reflected from the BD 1. These signals are generated by the ODC 620.

As for the TE signal, the optical disc drive 102 generates a TE signal by the push-pull method during writing and by the phase difference method during reading, respectively.

The optical disc drive 102 of this preferred embodiment determines, based on the TE signal, whether or not there is a servo error before writing data on the BD 1. That is why the TE signal needs to be generated based on a light detection signal representing the light reflected from an area where no data is stored. For that reason, the TE signal is preferably generated by the push-pull method as is done during writing. Thus, the processing of generating a push-pull TE signal will be described to begin with.

An adder 408 of the ODC 620 outputs a sum signal of the areas B and D of the photodetector 208, while an adder 414 outputs a sum signal of the areas A and C of the photodetector 208. A differential amplifier 410 receives the outputs of these two adders 408 and 414 and outputs a push-pull TE signal representing their difference. A gain switcher 416 adjusts the amplitude of the push-pull TE signal to a predetermined one (gain). An A/D converter 420 converts the output push-pull TE signal of the gain switcher 416 into a digital signal and passes it to a DSP 412.

On the other hand, the phase difference TE signal can be obtained in the following manner. Specifically, the adder 344 may output a sum signal A+D, of which the magnitude corresponds with the sum of the outputs of the areas A and D, while the adder 346 may output a sum signal B+C, of which the magnitude corresponds with the sum of the outputs of the areas B and C, for example. Alternatively, other signals may also be generated if the sums are calculated differently. Comparators 352 and 354 binarize the output signals of the adders 344 and 346, respectively. A phase comparator 356 compares the phases of the output signals of the comparators 352 and 354 to each other.

A differential amplifier 360 receives the output signal of the phase comparator 356 and outputs a phase difference TE signal, which is used to perform a control operation that makes the light beam follow the right track on the BD 1.

A gain switcher 366 adjusts the amplitude of the phase difference TE signal to a predetermined value. An A/D (analog-to-digital) converter 370 converts the phase difference TE signal supplied from the gain switcher 366 into a digital signal.

The FE signal is generated by the differential amplifier 358. The FE signal may be detected by any method—by astigmatism method, knife edge method or even spot sized detection (SSD) method. The circuit configuration may be changed appropriately according to the detection method adopted. A gain switcher 364 adjusts the amplitude of the FE signal to a predetermined value. An A/D converter 368 converts the FE signal supplied from the gain switcher 364 into a digital signal.

A DSP 412 controls the drive section 625 based on the TE and FE signals. A control signal FEPWM for focus control and a control signal TEPWM for tracking control are respectively output from the DSP 412 to the drivers 136 and 138 of the drive section 625.

In accordance with the control signal FEPWM, the driver 136 drives the focus actuator 143, which moves the objective lens 203 substantially perpendicularly to the information layer of the BD 1. On the other hand, in accordance with the control signal TEPWM, the driver 138 drives the tracking actuator 202, which moves the objective lens 203 substantially parallel to the information layer of the BD 1. It should be noted that the drive section 625 further includes a driver (not shown) for driving a transport stage on which the optical pickup 610 is mounted. By driving the transport stage with a voltage applied to the driver, the optical pickup 610 can move to any arbitrary location in the radial direction.

Next, a configuration for reading data will be described.

An adder 372 adds together the respective outputs of the areas A, B, C and D of the photodetector 208, thereby generating an all sum signal (A+B+C+D), which is then input to the HPF 373 of the ODC 620.

The all sum signal has its low frequency component filtered out by the HPF 373, is passed through an equalizer section 374, is binarized by a binarization section 375, is subjected to PLL, error correction, demodulation and other processing by an ECC modulator/demodulator 376 and then is temporarily stored in a buffer 377. The capacity of the buffer 377 has been determined with various playback conditions taken into account.

The data in the buffer 377 is read at the timing of playing back video, for example, and then output as read data to a host computer and an encoder/decoder (not shown) by way of an I/O bus 170. In this manner, video or any other type of data can be played back.

Next, a configuration for writing data will be described.

The write data stored in the buffer 377 is provided with an error correction code by the ECC modulator/demodulator 376 to be encoded data. Subsequently, the encoded data is modulated by the ECC modulator/demodulator 376 to be modulated data, which is then input to a laser driver 378. And the laser driver 378 controls the light source 204 based on the modulated data, thereby modulating the power of the laser beam.

In any of the preferred embodiments of the present invention to be described later, the optical disc apparatus basically has the same configuration as the one illustrated in FIG. 5.

Procedure of Registering Defects

Figure 6:
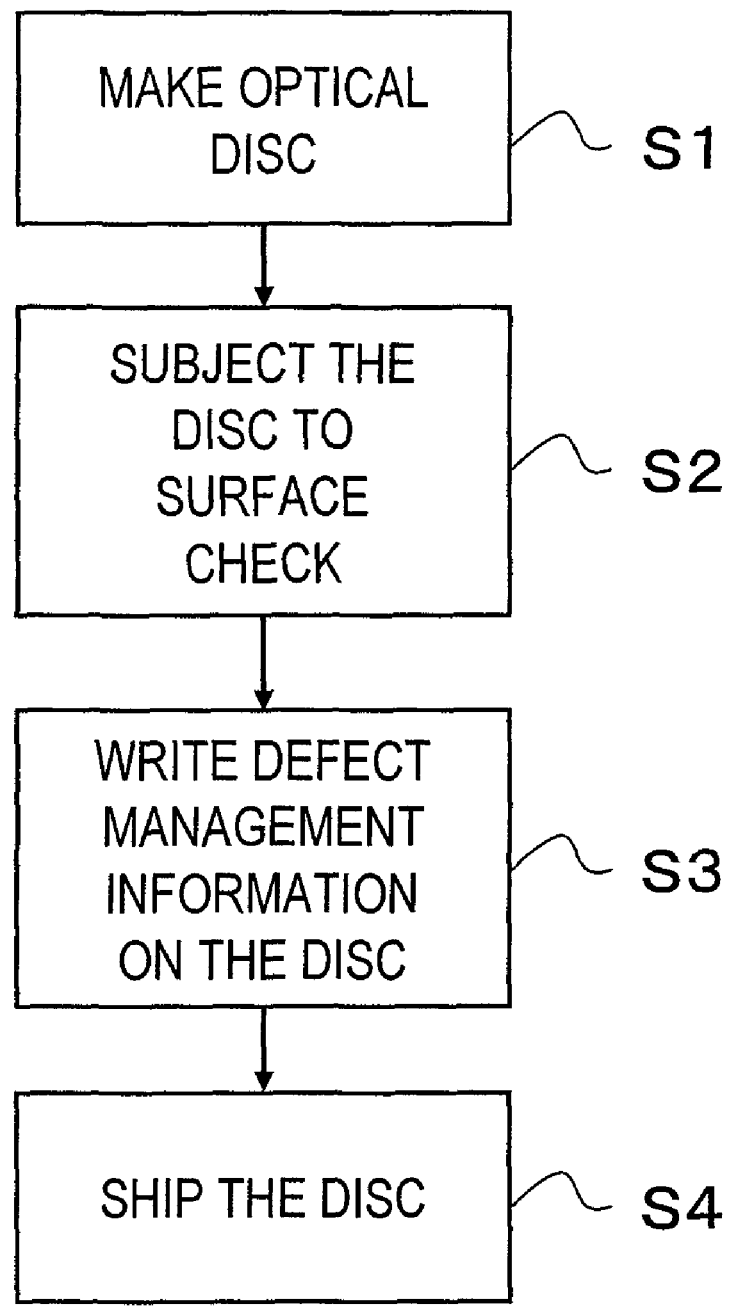
FIG. 6 is a flowchart showing the procedure of registering defects before the optical disc is shipped according to the first preferred embodiment.

FIG. 6 is a flowchart showing the procedure of registering defects before a given optical disc is shipped. Hereinafter, it will be described with reference to FIG. 6 how defects detected on an optical disc may be registered.

First, in Step S1, an optical disc is made by some known process. In this preferred embodiment, a single-layer optical disc with only one storage layer may be formed. The optical disc for use in the present invention does not have to be a single-layer optical disc but may naturally be a multilayer optical disc with a number of storage layers that are stacked one upon the other.

Next, in Step S2, the optical disc is subjected to a surface check (i.e., a defect search). Hereinafter, the features of various kinds of defects and a method for distinguishing those defects detected will be described with reference to FIGS. 7(a) through 7(e).

FIGS. 7(a) through 7(e) illustrate how a TE signal (tracking error signal) and an AS signal (all sum signal) change due to the presence of any of five typical defects on an optical disc. The TE signal corresponds to the output of the differential amplifier 410 shown in FIG. 5 and the AS signal corresponds to the output of the adder 372.

First of all, dust is deposited thinly over a broad range on the surface of an optical disc and can be detected with naked eyes. That is why if the user has detected dust on an optical disc with his or her own eyes before using it, he or she can wipe the dust away with a piece of cloth or tissue paper. However, sometimes the user may fail to notice the presence of dust. Or even if he or she has tried wiping dust away, some of the dust could be left deposited on the disc surface.

Figure 7:
FIG. 7 illustrates how TE and AS signals will vary due to the presence of any of five major defects that affect signals generated from an optical disc.

As shown in FIG. 7(a), dust is deposited uniformly over a broad range on the disc surface, and therefore, has a much greater size than the diameter of a light beam spot. That is why when crossing the dust as the optical disc turns, the light beam will never deviate greatly. As a result, the TE signal to be generated as a difference between ±first-order diffracted rays will never vary significantly, either. Nevertheless, if there is dust on the surface, the intensity of the light that has passed through the dust and reached a reflective layer and that of the light that has been reflected from the reflective layer will both decrease, thus lowering the level of the AS signal to be generated based on the reflected light.

On the other hand, dirt is called "black dots (BDO)" and is a defect that has a lower optical transmittance (i.e., a higher opacity) than dust. Ever since CDs were put on the market, test optical discs with a defect corresponding to dirt have been used to evaluate the performance of drives. Dirt, as well as dust, is deposited on the surface of a disc but can be easily distinguished from dust because dirt will decrease the intensity of reflected light by as much as 50%. Also, generally speaking, an area on which dirt is deposited is smaller than an area on which dust is deposited. For these reasons, if there is dirt on a disc surface, the amplitude of the AS signal will decrease significantly locally in a narrow range as shown in FIG. 7(b). Meanwhile, the ±first-order diffracted rays will be equally cut off by the dirt, and therefore, the TE signal will be output in the vicinity of zero unless there is some big disturbance such as eccentricity. Consequently, the TE signal will not vary significantly due to the presence of dirt. To reduce a variation in the TE signal due to a disturbance caused by the passage of a light beam through the dirt, the optical disc apparatus generates a gate signal, of which the length corresponds to the amount of time it takes for the light beam to pass the dirt, on detecting the dirt, and then gets the tracking drive on hold with that gate signal. However, by getting the tracking drive on hold in that way, the variation in the TE signal will be neglected while the light beam is passing through the dirt. As a result, no tracking failure will be caused due to the presence of dirt.

As a light beam for use with CDs or DVDs forms a beam spot on the disc surface that is greater than fingerprint dots, it has been difficult to detect a fingerprint from a CD or a DVD. As for a BD, on the other hand, as a narrower beam spot is formed on the disc surface, fingerprint dots can be detected. On top of that, a BD is associated with a greater NA of 0.85 and will be affected by aberration more significantly. That is why when a light beam passes through each fingerprint dot on a BD, the reflected light intensity will vary. As a result, the AS signal has a waveform, of which the level decreases when the light beam passes through each fingerprint dot, as shown in FIG. 7(c). On the other hand, since a TE signal is a differential signal, the decrease in reflected light intensity and the influence of spherical aberration would be canceled, and therefore, the TE signal is affected just slightly.

The dust, dirt and fingerprints mentioned above are defects to be left on the surface of an optical disc after the optical disc has been made (which are sometimes called "surface defects" or "secondary defects"), and therefore removable from the disc surface. That is why these defects can be called "non-permanent defects".

On the other hand, a bubble is a defect to be produced inside an optical disc being manufactured, not on its surface, and is often produced between an information layer and a light transmissive layer when the light transmissive layer is formed on the information layer. Bubbles produced in a BD typically have a size (i.e., diameter) of approximately 50-100 μm. Once an optical disc has been made, the bubbles can never be repaired or removed, and therefore, are left as permanent defects. In this respect, bubbles are quite different from the dust, dirt and fingerprints mentioned above.

Figure 2:
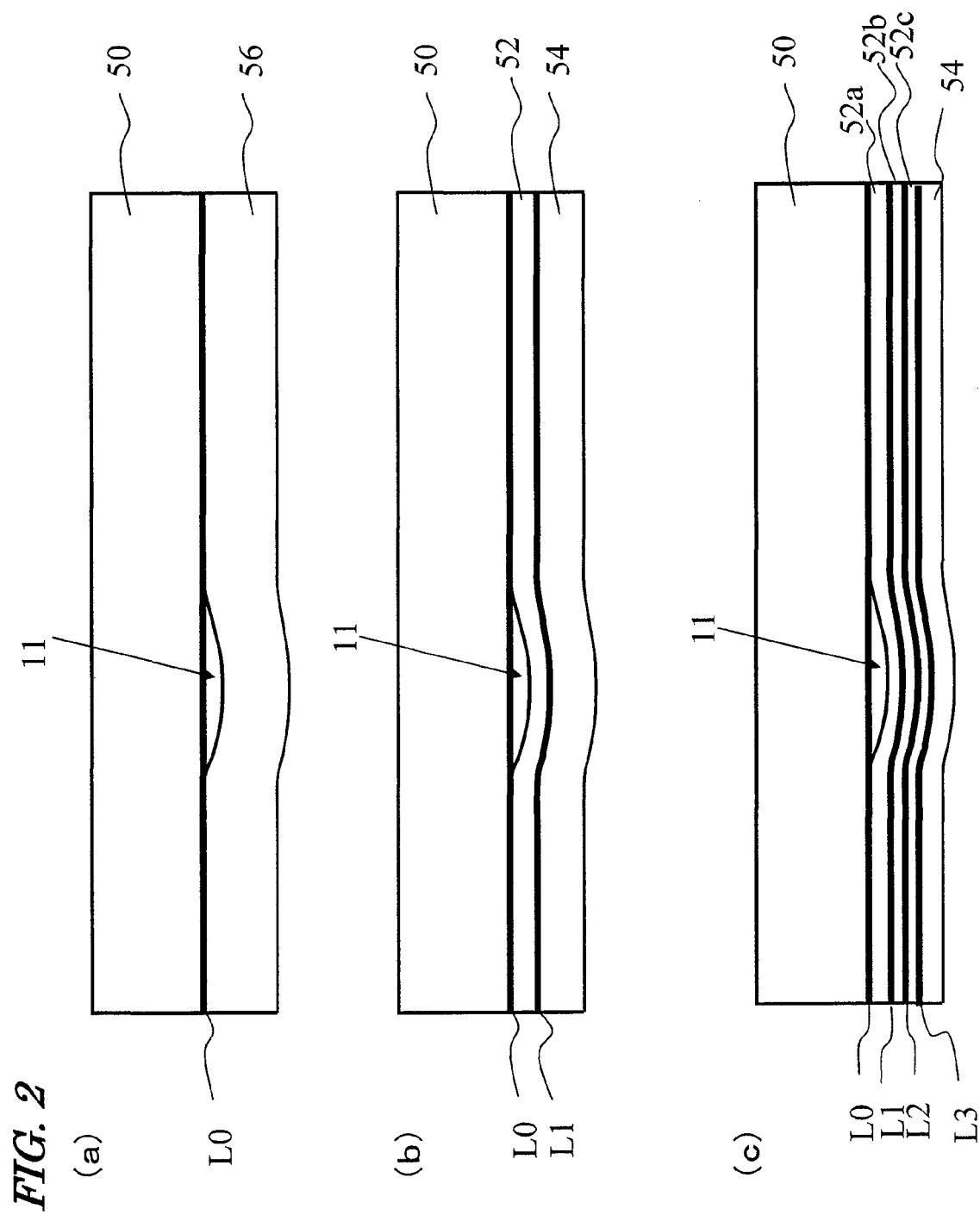
FIGS. 2(a), 2(b) and 2(c) are schematic cross-sectional views illustrating how a bubble affects a single-layer disc, a dual-layer disc, and a four-layer disc, respectively.

If a bubble were produced between the information layer of a BD and the light transmissive layer thereof, the surface of the light transmissive layer would be raised locally as shown in FIG. 2 because the light transmissive layer has as small a thickness as approximately 100 μm.

When the center (or the core) of a bubble is irradiated with a light beam, almost no reflected light returns from it. And when the raised portion surrounding the bubble (i.e., an area with a diameter of 500 μm to 1,000 μm) is irradiated with a light beam, the light beam is not transmitted or reflected normally, either. An objective lens for use to perform a read/write operation on a BD has a high numerical aperture NA and forms a focal point on a shallow information layer under the surface of the disc. That is why even if the light-transmitting layer were deformed only slightly, the spherical aberration would change significantly and the intensity of the diffracted light would vary easily.

That is why when a light beam crosses a bubble in a BD, the level of the AS signal will decrease only locally due to the presence of the bubble core but the TE signal is affected in a wide range surrounding the bubble core to have a disturbance waveform as shown in FIG. 7(d). Such a waveform component is produced due to the presence of a bubble even if the light beam does follow the centerline of the tracks. That is why such a component will be referred to herein as a "pseudo off-track component" of a TE signal. If such a pseudo off-track component were produced in the TE signal, the tracking control would be carried out in response to the pseudo off-track component and the light beam spot would come off the target track, which is a problem called "abnormal track jump".

Once a bubble has been produced in a multilayer optical disc, whenever a light beam crosses the bubble, the pseudo off-track component will be produced in the TE signal, no matter how deep the bubble is located under the disc surface. That is to say, the area defined by projecting the bubble onto each storage layer perpendicularly to the disc surface is preferably managed as a permanent defect area and the user's access to that area is preferably barred.

If there is a single bubble inside a multilayer optical disc, then a portion of each storage layer that covers a storage capacity of approximately 20 megabytes (MB) will be registered as a "defective area". For example, in an optical disc in which four storage layers, each having a data storage capacity of approximately 20 gigabytes (GB), are stacked one upon the other, the presence of even a single bubble will decrease its overall data storage capacity by approximately 80 MB (=20 MB×4). In that case, the presence of a single bubble will decrease the data storage capacity of each storage layer by approximately 1%. That is why if there were ten bubbles, the overall data storage capacity of the optical disc would decrease by as much as 10%.

People are now proposing that a lot of storage layers (which may be at least five layers and could be 16 layers, for example) be stacked one upon the other in a single BD in the near future. In a BD with a stack of that many storage layers, a single bubble will not always affect every storage layer thereof. That is to say, as for a storage layer that is located far away from the core of the bubble, there could be no need to register an area of that storage layer defined by projecting the bubble there as a "permanent defect area". Specifically, in a BD with a stack of 16 storage layers, the respective bubble projected areas of four storage layers that are located relatively close to the bubble core may be registered as "permanent defects" but those of the other storage layers need not be registered as "permanent defects".

A scratch is a defect to be made on the surface of an optical disc by some external force, can neither be repaired nor removed normally, and therefore, belongs to "permanent defects". If an optical disc is not stored in its jewel case but left on a desk or a rack, the surface of the disc could get scratched on the surface. Or if the optical disc to be inserted into, or ejected from, a drive has collided against a corner of its tray, for example, the surface of the disc could also get scratched easily. The scratch is a physically depressed portion of the disc surface, and therefore, the TE and AS signals will be affected much more significantly than other surface defects as shown in FIG. 7(e). Although it depends on the depth of a scratch, supposing the scratch is deep enough to affect a write signal or a tracking signal, the amplitude of the AS signal will decrease almost as much as when there is a fingerprint and the TE signal will be affected to approximately the same degree as when there is a bubble.

FIG. 8 is a table summarizing how those various types defects on a BD will affect an AS signal and a TE signal. The influences of those various defects on the AS signal are detected based on a variation in reflected light intensity and an error rate, while their influences on the TE signal are detected as "abnormal track jumps". In FIG. 8, the open circle "○" indicates that the error rate is low and that the abnormal track jump will rarely occur. On the other hand, the cross "x indicates that the error rate is high and that the abnormal track jump will occur often. As for a bubble, for example, the resultant error rate is high and abnormal track jumps occur often.

As can be seen from FIG. 8, a bubble will often cause abnormal track jumps, and therefore, it is easy to sense, based on a variation in the TE signal, that the defect encountered is a bubble. As for a fingerprint, on the other hand, the fingerprint will rarely cause abnormal track jumps and hardly vary the TE signal. However, as the light intensity varies significantly when the light beam passes through a fingerprint, the defect encountered can be recognized as a fingerprint by counting the number of times of changes of the AS signal. Furthermore, as dirt causes a significant variation in light intensity, the defect encountered can be recognized as dirt based on the magnitude of the variation in the AS signal.

For these reasons, fingerprints, bubbles and dirt can be detected unambiguously based on the TE and AS signals. On the other hand, dust, scratches and other defects can be estimated by the magnitude of a variation in light intensity and the extent of the range where the light intensity has varied (i.e., the disturbance range shown in FIG. 8). That is to say, the type the defect encountered can be recognized by a reflected light intensity, a read error rate and a tracking error.

Figure 5:
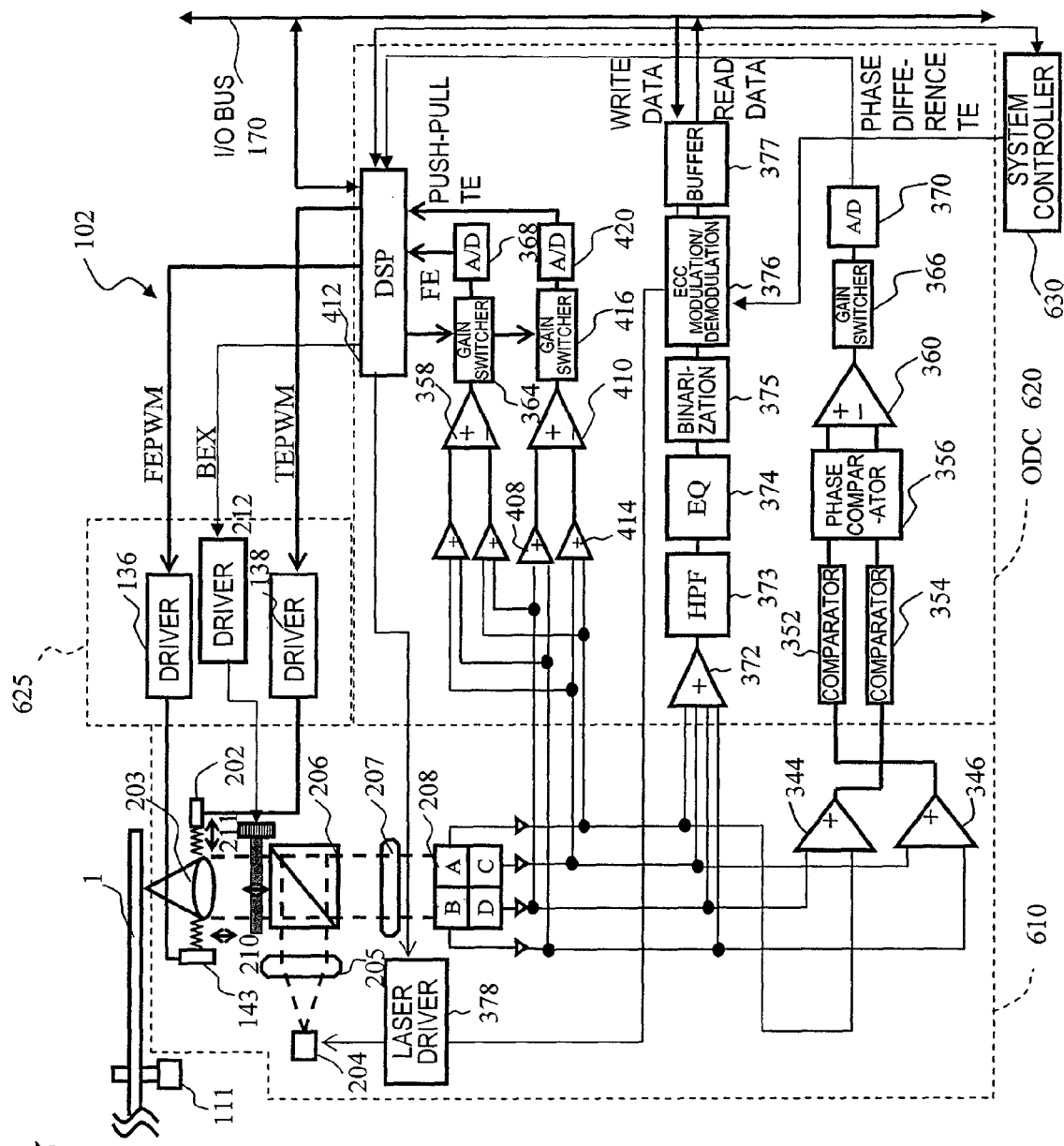
FIG. 5 illustrates an exemplary hardware configuration for an optical disc drive 102 as a first specific preferred embodiment of the present invention.
Figure 9:
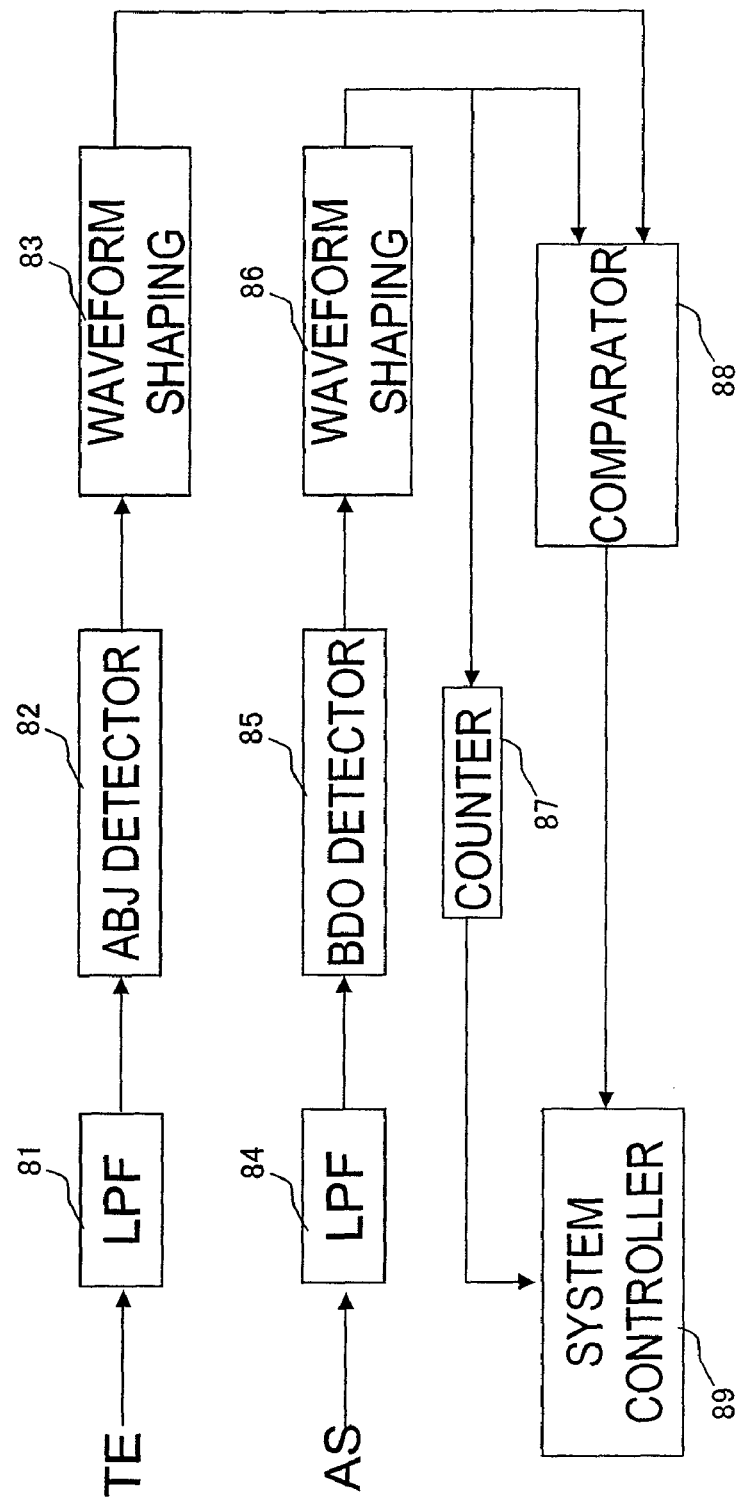
FIG. 9 illustrates the arrangement of defect detecting blocks that carry out a defect search using the DSP and the system controller shown in FIG. 5.
Figure 10:
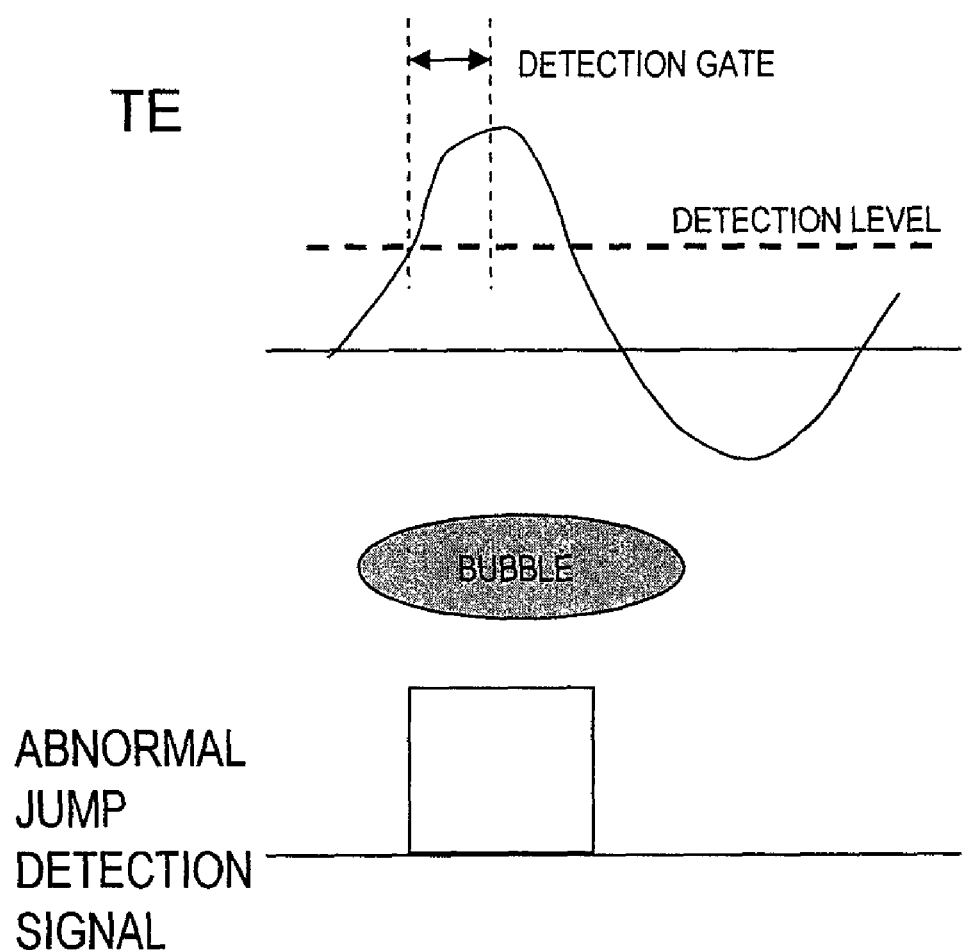
FIG. 10 illustrates how an abnormal jump detector with a predetermined threshold value and a detection gate operates.

FIG. 9 is a block diagram illustrating the arrangement of a defect detecting section, which is implemented by the DSP and the system controller shown in FIG. 5. The TE signal supplied from the differential amplifier 410 (see FIG. 5) is input to an LPF (low-pass filter) 81 as shown in FIG. 9. The TE signal has its noise reduced by the LPF 81, and then is supplied to an abnormal jump (ABJ) detector 82, which has circuitry for outputting a detection signal when the TE signal exceeds a predetermined threshold value as shown in FIG. 10. The ABJ detector 82 can detect a significantly varied part of the TE signal that has been produced due to the presence of a bubble.

The output of the ABJ detector 82 is supplied to a waveform shaping circuit 83 as shown in FIG. 9. The signal input to the waveform shaping circuit 83 is subjected to noise reduction and digitized there, and then supplied to a comparator 88.

Figure 11:
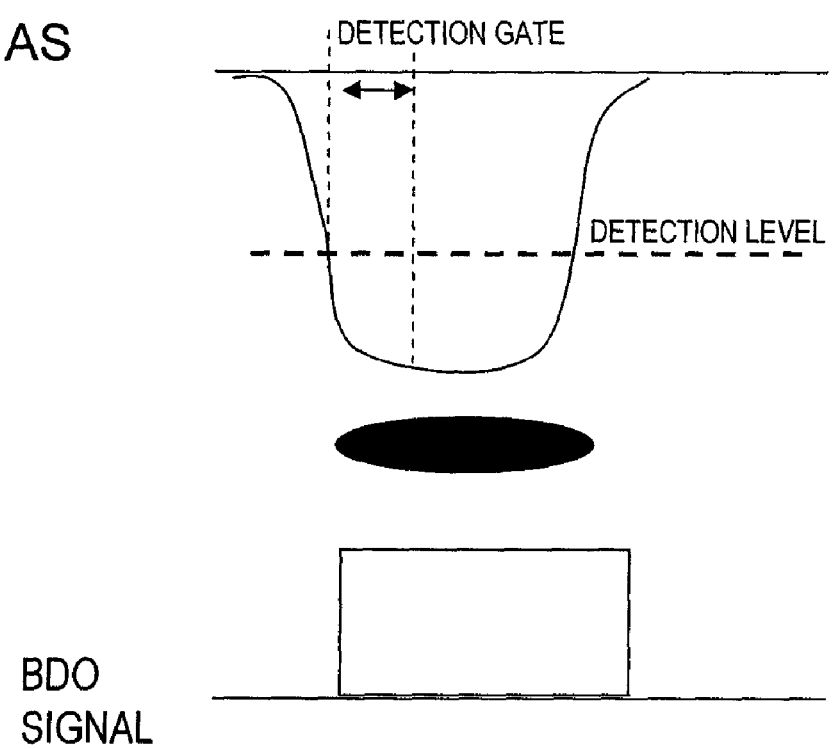
FIG. 11 illustrates how a BDO detector with a predetermined threshold value and a detection gate operates.

The AS signal has its noise reduced by an LPF 84 and then is input to a BDO detector 85. As shown in FIG. 11, the BDO detector 85 has circuitry for outputting a detection signal when the AS signal exceeds a predetermined threshold value. The BDO detector 85 can detect a significant variation in the AS signal that has been caused by dirt.

The output of the BDO detector 85 is supplied to a waveform shaping circuit 86. The signal input to the waveform shaping circuit 86 is subjected to noise reduction and digitized there, and then supplied to the comparator 88.

To detect a fingerprint, the output of the BDO waveform shaping circuit 86 is also supplied to a counter 87. If the changes of the AS signal, representing as many fingerprint dots, are counted a predetermined number of times (e.g., five times or more), a fingerprint is detected. The output signal of the comparator 88 is supplied to a system controller (CPU) 89. Based on the combination of a variation in the TE signal and a variation in the AS signal, fingerprints, bubbles and dirt can be distinguished from each other.

Scratches and dust, other than the three types of defects consisting of fingerprints, bubbles and dirt, have various sizes and depths (or thicknesses). Since those three types of defects can be distinguished from each other, dust and scratches are detected as defects other than those three types to begin with. Then, it is determined whether the defect is dust or a scratch. Specifically, this decision is made by the estimating method described above.

By performing the defect search processing steps described above, the type of the defect encountered can be recognized.

Now look at FIG. 6 again.

In Step S3, defect management information, including the locations and sizes of the defects that have been found as a result of the defect search described above, is written on a predetermined area on the optical disc. In this preferred embodiment, if the defect has been recognized to be a non-permanent defect, an identifier (or flag), indicating its identity as a non-permanent defect, is added, and information about the defect with that identifier, as well as its type, is added to a first predetermined defect management area. On the other hand, if the defect has been recognized to be a permanent defect, an identifier (or flag), indicating its identity as a permanent defect, is added, and information about the defect with that identifier, as well as its type, is added to a second predetermined defect management area.

In this preferred embodiment, bubbles and scratches are classified as permanent defects. If a technique for repairing scratches on a BD becomes popular in the near future, however, scratches may be classified as non-permanent defects.

When finishing its check (i.e., the defect search), the optical disc testing apparatus of this preferred embodiment writes defect management information on the defect management area of the given optical disc. If the optical disc is a rewritable one (such as a BD-RE), an identifier (i.e., a flag) indicating whether the defect is a permanent one or not, the type of the defect detected (i.e., a fingerprint, a bubble or dirt), and information about the size and location of the defect are written on the defect management areas 30a, 31a, 32a and 33a of the optical disc shown in FIG. 12. On the other hand, if the given optical disc is a write-once optical disc (such as a BD-R), then an identifier (i.e., a flag) indicating whether the defect is a permanent one or not, the type of the defect detected (i.e., a fingerprint, a bubble or dirt), and information about the size and location of the defect are written on the first one of the temporary disc management areas (TDMAs) shown in FIG. 12. Those pieces of information are transferred from the temporary disc management area (TDMA) 34 to, and eventually stored in, the defect management areas (DMAs) 30a, 31a, 32a and 33a as a result of finalize processing. On a BD-R, the temporary defect list (TDFL) in the TDMS update unit includes non-permanent defects. However, by eliminating such non-permanent defects, the temporary disc management area (TDMA) 34 will be consumed to a lesser degree.

Figure 12:
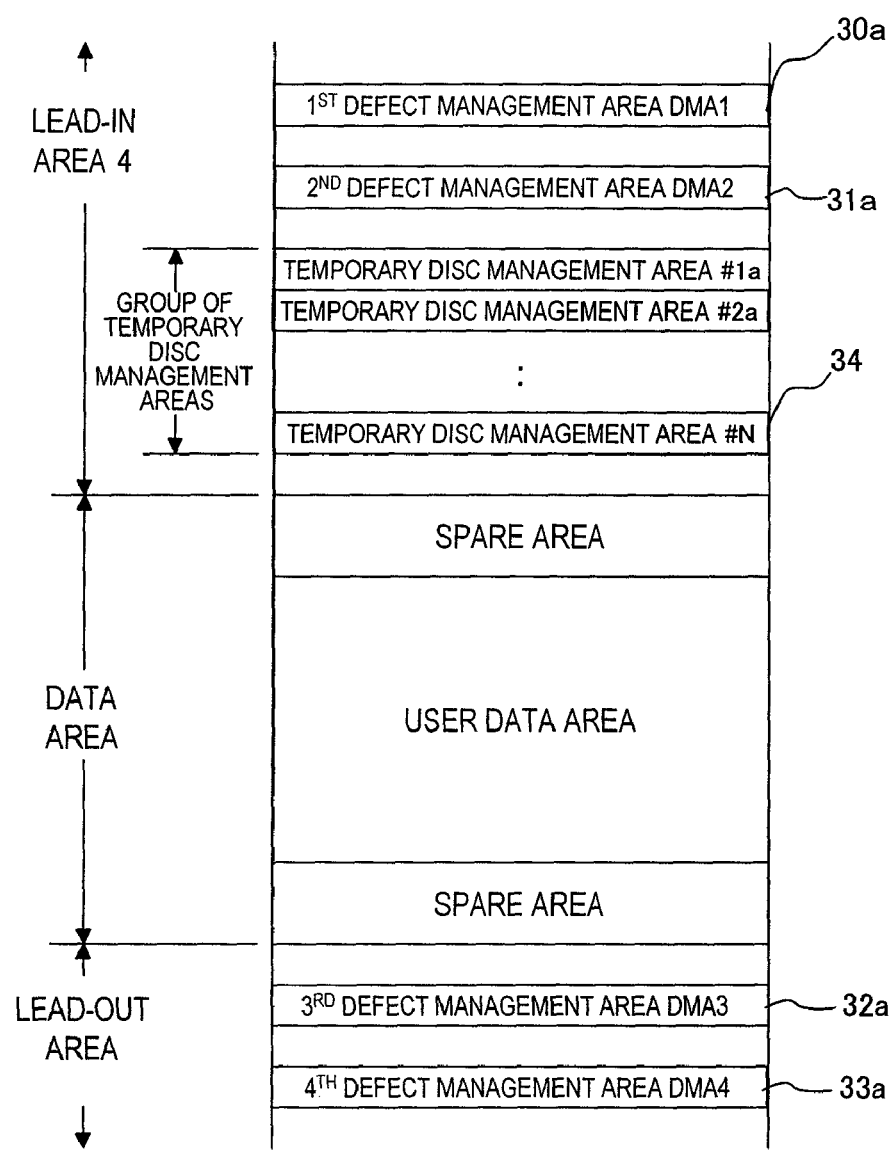
FIG. 12 illustrates a detailed data structure of a multilayer optical disc 1.

The defect management information collected by the manufacturer of the optical disc through the defect search before the optical disc is shipped is written on that optical disc by the optical disc testing apparatus of that manufacturer before the optical disc is shipped. In the example described above, the defect management information is preferably stored in a defect registering area, which is arranged closer to the inner edge of the optical disc than the first defect management area (DMA1) 30a shown in FIG. 12 is. In the lead-in area 4 on an optical disc, arranged closer to the inner edge is a drive area (not shown in FIG. 12). That is to say, in the lead-in area 4 shown in FIG. 12, the drive area is located closer to the inner edge of the optical disc than the DMA areas are, and is defined uniquely by individual manufacturers of optical disc apparatuses. That is to say, to the drive area allocated to a particular manufacturer, information required to operate an optical disc apparatus made by that manufacturer is stored appropriately. The defect registering area of this preferred embodiment is arranged inside that drive area.

Figure 13:
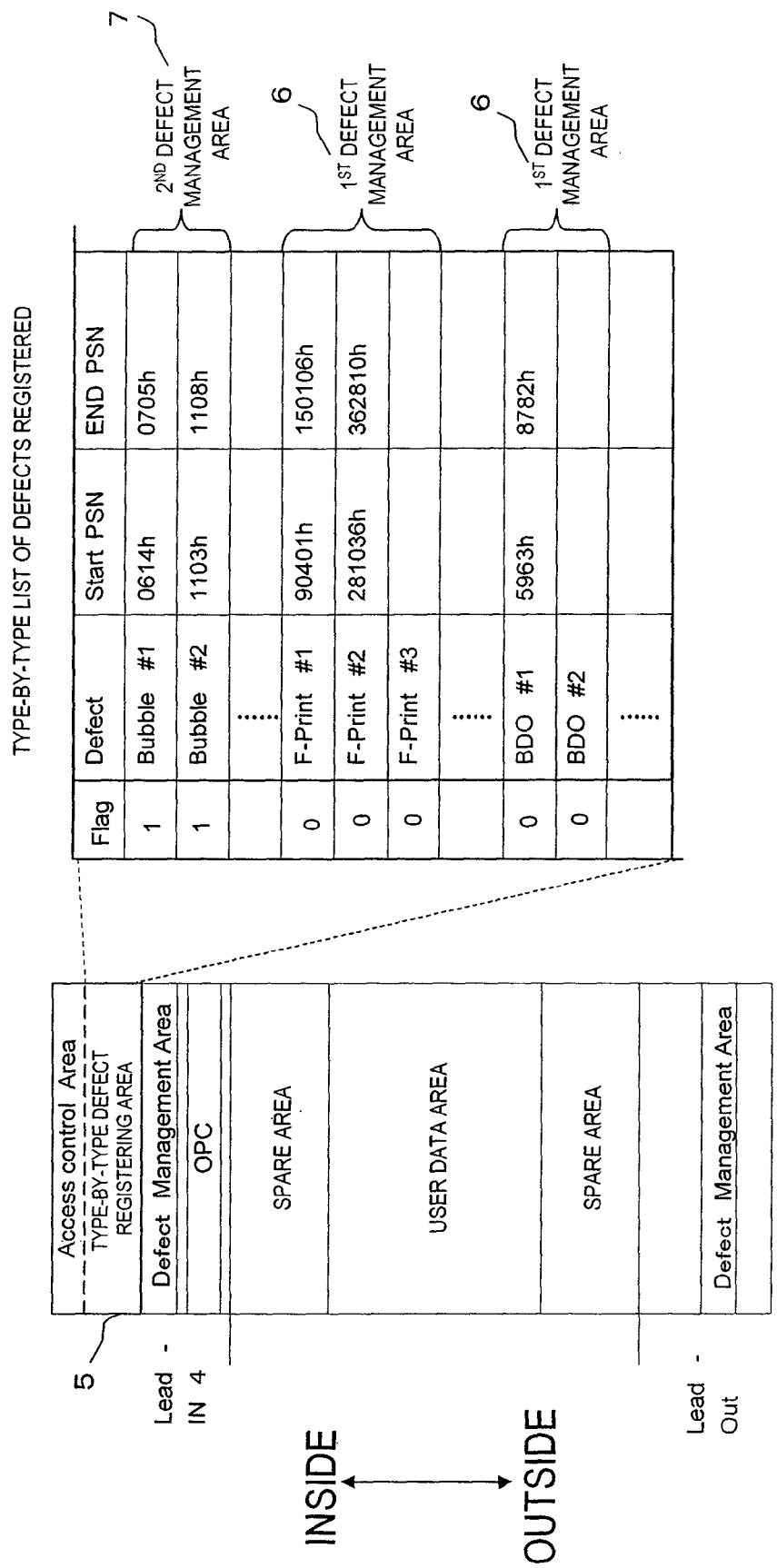
FIG. 13 illustrates exemplary contents of defect management information stored on an optical disc.

FIG. 13 illustrates the structure and arrangement of a type-by-type defect registering area. An optical disc testing apparatus to be preferably used in this preferred embodiment writes defect management information on the type-by-type defect registering area (drive area) 5 shown in FIG. 13. That type-by-type defect registering area is arranged in an access control area, which will be described in detail later with reference to FIG. 23.

In the example illustrated in FIG. 13, defect management information, including: identifiers (or flags), each of which is a piece of defect attribute information indicating whether the defect is a permanent one or not; defect type recognition information indicating the sort (i.e., specific type) of each defect such as a fingerprint, a bubble or a BDO (dirt); and defect location information indicating the sizes and locations of the respective defects, is written on the drive area 5. Specifically, in the example illustrated in FIG. 13, a flag "0" indicates that the defect is a non-permanent one (which will be referred to herein as a "first type of defect") and a flag "1" indicates that the defect is a permanent one (which will be referred to herein as a "second type of defect"). Examples of non-permanent defects include fingerprints and dirt, while examples of permanent defects include bubbles 4.

The size of each defect is substantially indicated by the difference between Start PSN and END PSN. Once the start point and size of a defect have been detected, the end point of that defect will be determined automatically. That is why the information to be recorded as the location and size of a defect may be either the start and end points of the defect or the start point and size of the defect.

In the example illustrated in FIG. 13, an identifier (or flag) is supposed to be used as defect attribute information indicating whether the given defect is a permanent one or not. However, the defect management information for use in the present invention does not have to be an identifier. Alternatively, the defect management area may be split into two defect management areas with a fixed address, defect management information about permanent defects may be added to one of those two areas, and defect management information about non-permanent defects may be added to the other area. In that case, defect attribute information indicating whether the given defect is a permanent one or not can be added even without using any identifier (or flag) as a piece of defect attribute information.

Defect information about non-permanent defects may be written on the DMA area as in the prior art, while defect information about permanent defects, along with their defect location information, may be written on a different defect management area from the DMA area. In that case, by accessing the defect management area in which the information about permanent defects is stored and retrieving information from that defect management area, the locations of the permanent defects can be known. That is why in either case, defect attribute information, by which it can be determined whether the defect detected is a permanent one or a non-permanent one, is stored in the defect management area.

As described above, in a preferred embodiment of the present invention, the optical disc has a defect management area to store defect attribute information, by which it can be determined whether the defect detected is a permanent defect or a non-permanent defect, and defect location information indicating the location of the defect. The content of the defect attribute information may change according to the attribute or type of the defect. Also, the defect attribute information may include information indicating the specific type of the defect. In a specific preferred embodiment, the optical disc just needs to include information, by which it can be determined, by reference to the defect attribute information, whether the defect detected is a bubble or not.

The defect attribute information indicating whether the defect detected is a permanent one or not may be identified by one bit, for example. As for the defect type recognition information indicating the sort of the defect, on the other hand, the sort (i.e., the specific type) of the defect may be identified by three bits, for example.

A bubble is a primary defect to be produced during the manufacturing process and is characterized by deforming the waveform of the TE signal over a broad range on the optical disc. If the optical disc apparatus is loaded with an optical disc with a bubble and tries to access an area in which the bubble is present, then an abnormal track jump and other failures will occur. For that reason, it is preferred that the user's access to such a bubble area be barred.

Then in Step S4 shown in FIG. 6, an optical disc in which those pieces of information are stored is shipped.

As described above, if the manufacturer of an optical disc stores those pieces of information such as an identifier indicating whether the defect detected is a permanent one or not in the drive area 5 of the optical disc before it is shipped, an appropriate type of processing can be done adaptively according to the type of the defect encountered by retrieving the defect management information (such as the identifier indicating whether the defect is a permanent one or not) from the drive area 5 of that optical disc. For example, information about a first type of defect as a non-permanent defect that is added to the first defect management area 6 may be updated, but information about a second type of defect as a permanent defect that is added to the second defect management area 7 may not be updated (i.e., write-protected).

If information about defects is stored on a type-by-type basis in each defect registering area shown in FIG. 13, an appropriate type of processing can be performed according to the type of the defect encountered. For example, even if no replacement areas are available anymore but if the defect list includes a lot of removable defects such as dust and fingerprints, then the user may be notified of that and prompted to wipe them away by cleaning. And when he or she has gotten the cleaning done, those defects registered may be removed from the defect list. By carrying out such processing, the number of non-permanent defects can be reduced and the number of recordable areas on the optical disc can be increased.

As for a bubble, "slip replacement" is preferably carried out. As used herein, the "slip replacement" means skipping the physical address of an area with a bubble when logical addresses get associated with physical ones. As a result of the slip replacement, such an area with a bubble becomes almost non-existent from the optical disc apparatus' point of view. That is why by performing the slip replacement by reference to the defect management information that is stored on an optical disc that is going to be shipped, it is possible to prevent a user who purchased the optical disc from accessing such an area with a bubble when he or she is writing data on that optical disc.

The foregoing description relates to the processing to be carried out by the manufacturer of an optical disc to be shipped in order to detect any defects from the optical disc and write defect management information, if any, on that optical disc. However, the same processing could also be carried out by the buyer of an optical disc when he or she gets the optical disc loaded into an optical disc apparatus for the first time. Among the various types of defects described above, a bubble is produced during the manufacturing process, and therefore, is preferably detected as early as possible (hopefully before the optical disc is shipped but at least when the optical disc is used for the first time) and information about its location and size is preferably stored on the optical disc.

If the user of the optical disc attempts to get the defect search done using his or her own optical disc apparatus (such as a player or a recorder), then that optical disc apparatus should have a configuration and functions that are equivalent to those of the optical disc testing apparatus described above.

Generally speaking, non-permanent defects are rarely produced during the manufacturing process of an optical disc. And even if such non-permanent defects have been produced on an optical disc yet to be shipped, those defects are usually removed before the optical disc is shipped. That is why only defect information about bubbles is typically stored on an optical disc shipped. However, optical discs with relatively small scratches do not necessarily disposed of but could be shipped and put on sale at a discounted price. In that case, it is preferred that those scratches, as well as bubbles, be detected before the optical disc is shipped and defect management information about those scratches be stored on the optical disc.

Optical Disc Loading and Reading Methods

Figure 14:
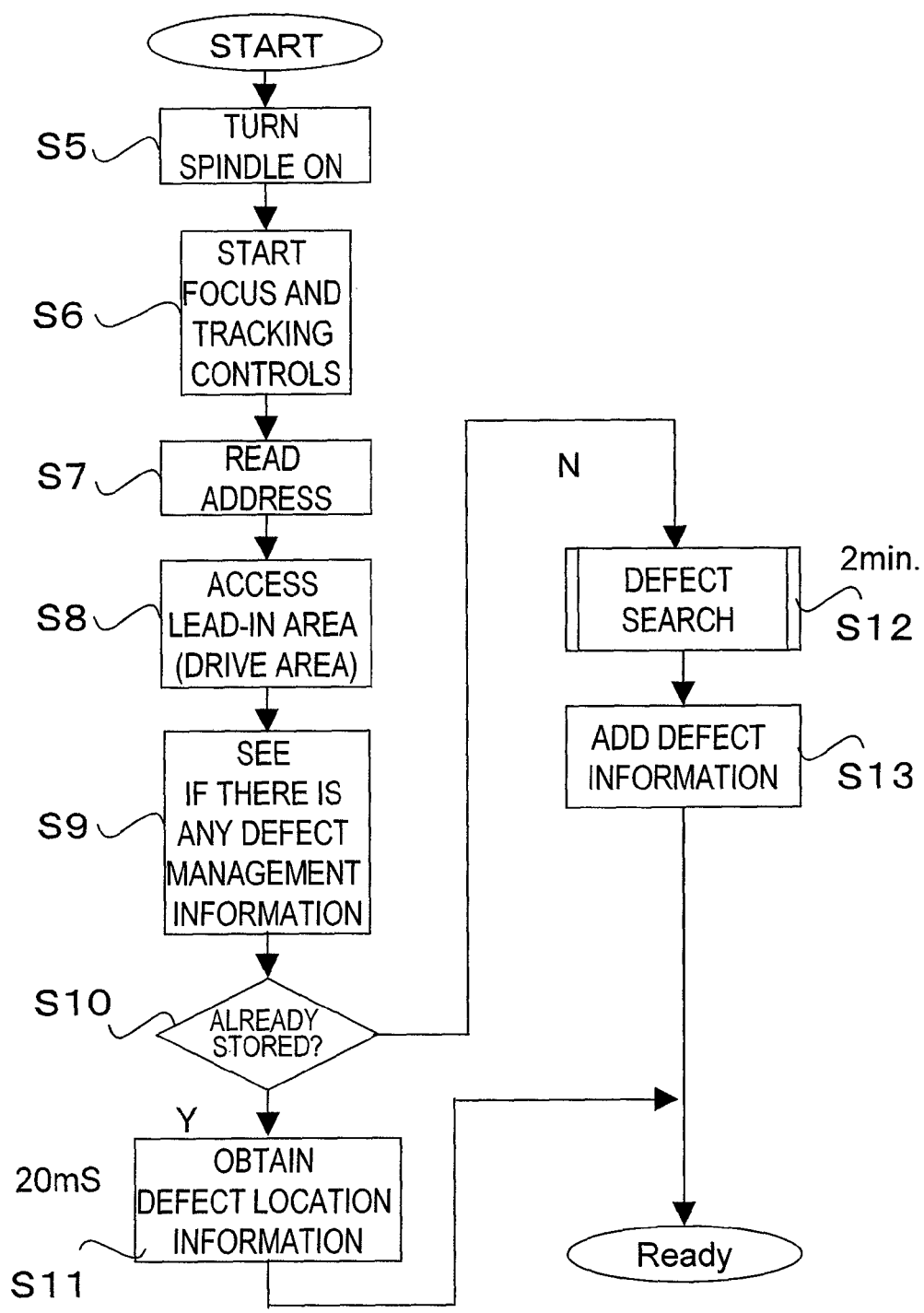
FIG. 14 is a flowchart illustrating an exemplary method for driving an optical disc apparatus according to the present invention.

Hereinafter, it will be described mainly with reference to FIG. 14 how to drive an optical disc apparatus that has been loaded with an optical disc on which defect management information has already been stored.

It should be noted that this optical disc may or may not have been subjected to the defect search by the optical disc apparatus of this preferred embodiment. That is to say, the manufacturer of the optical disc may already have done a defect search on that optical disc before it is shipped and may already have written defect management information, obtained as a result of the defect search, on the optical disc yet to be shipped.

As shown in FIG. 13, in the drive area 5 of the optical disc for use in this preferred embodiment, stored are identifiers (or flags) indicating whether each defect is a permanent one or not, specific types of the defects such as fingerprint, bubble and dirt, and information about the sizes and locations of those defects.

Hereinafter, it will be described how to drive an optical disc apparatus according to this preferred embodiment.

First of all, the optical disc apparatus shown in FIG. 5 is turned ON and gets loaded with an optical disc with which defects have already been registered. Then, in Step S5, the spindle motor 111 for turning the optical disc starts rotating (i.e., turn spindle ON). Next, in Step S6, a focus control and a tracking control are started. In this manner, the drive area 5 in which those pieces of defect information is stored becomes now accessible with a light beam.

Next, in Step S7, the addresses are read and the current location of the light beam spot is determined. As for a BD, the addresses are recorded as wobbled patterns of the track grooves. Thereafter, in Step S8, the drive area 5 in the lead-in area 4 that is the innermost area on the optical disc is accessed to determine in the next processing step S9 whether or not there is any defect management information stored there. Then, in Step S10, it is determined whether or not any defect management information has already been stored on the optical disc. If the answer is YES (i.e., if already stored), the process advances to Step S11 to retrieve the defect location information from the optical disc.

On the other hand, if the answer to the query of the processing step S10 is NO (i.e., if no defect management information has been stored on the optical disc yet), then the process advances to Step S12 to carry out a defect search. Next, in Step S13, defect information is added to the drive area 5 on the optical disc.

As for an optical disc in which defect information has been stored in advance, there is no need to take a few minutes to do an initial defect search on the disc during the disc loading process but it will take just about 20 ms to read the defect information in order to write data with defective areas avoided safely. Consequently, the disc loading process can get done in a shorter time and the chances of write failures can be reduced. In addition, it is also possible to prevent the focus position of the light beam from entering any defect and causing the light beam to lose its focus.

The optical disc apparatus and optical disc of the present invention would contribute effectively to improving real time write performance for writing received data sequentially. The present invention prevents a defect from causing an error, thus realizing stabilized video recording performance. A BD is often used to record a digital broadcast stream content. Particularly when an MPEG-TS with a digital broadcast format needs to be converted into an MPEG2 stream or re-encoded in real time compliant with the MPEG4-AVC standard, an optical disc apparatus is sometimes allowed little time to get retry processing done. In such a situation, the present invention will achieve significant effects.

Embodiment 2

Figure 15:
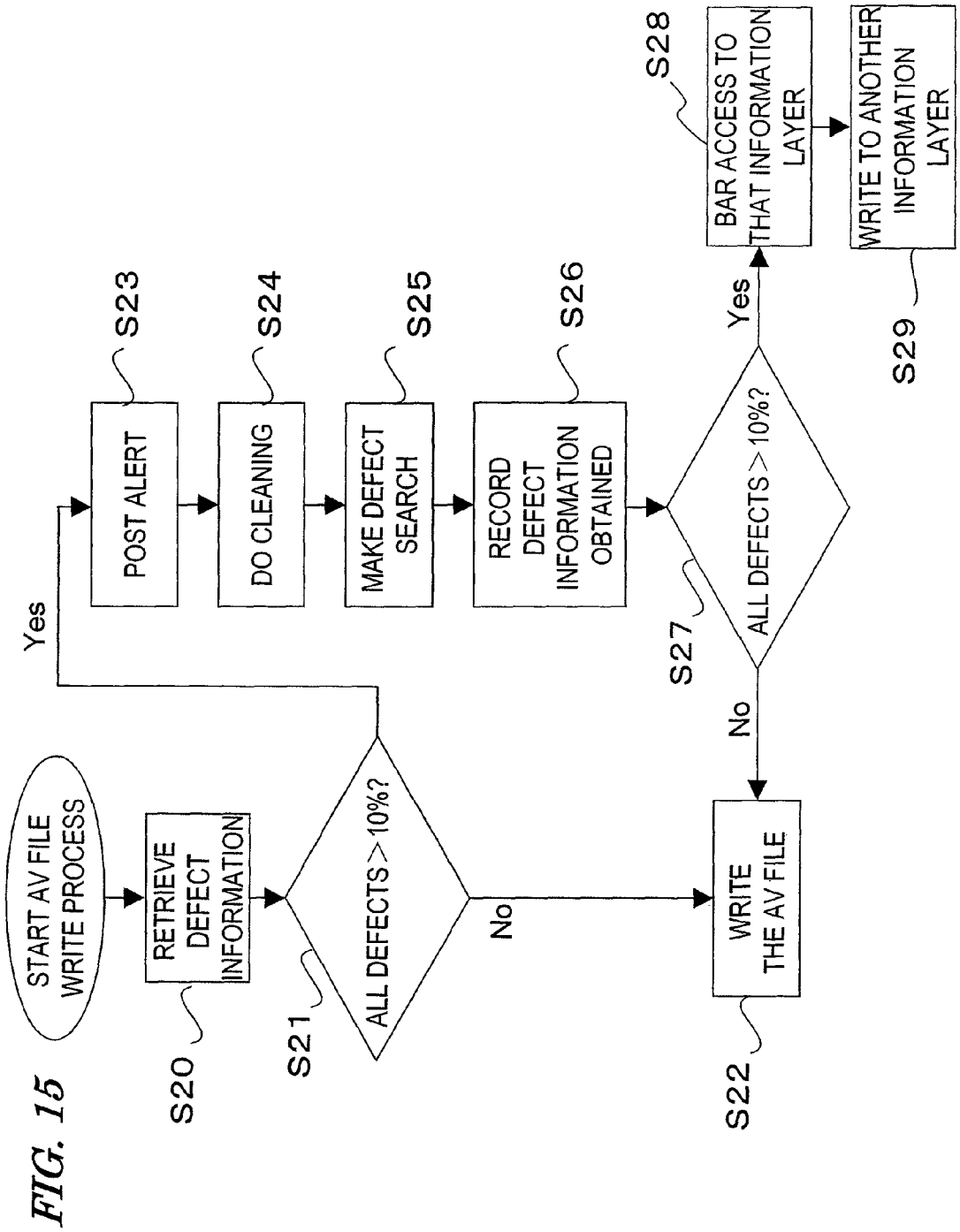
FIG. 15 is a flowchart illustrating another exemplary method for driving an optical disc apparatus according to the present invention.

Hereinafter, an exemplary operation to be preferably performed in a situation where the data to be written on an optical disc is an AV file (which is data to be written in real time) will be described with reference to FIG. 15.

First of all, before a write operation is started, defect information is retrieved in Step S20 from the given optical disc. The defect information may be obtained by reading the contents of the type-by-type defect list, which has already been recorded on the optical disc as shown in FIG. 13, from the optical disc. Alternatively, the type-by-type defect information may also be collected (or detected) by doing a defect search on the optical disc. In the latter case, while defect information is being collected by doing the defect search, the defect information thus obtained is preferably stored or updated on the optical disc.

Next, in Step S21, it is determined whether or not the ratio of the combined area of all sorts of defective areas to the overall data storage area (i.e., user data area) on the target information layer exceeds a predetermined value (e.g., 10% in this preferred embodiment). In the following description, the maximum size of user data that can be stored on an information layer of interest (i.e., the storage capacity per layer) will be referred to herein as "layer storage capacity" and the combined size of data that should have been written on all of those defective areas on that information layer as "defective area space size". In that case, the area ratio described above corresponds to the ratio of the defective area space size to the layer storage capacity. In the following description, the ratio of the defective area space size to the layer storage capacity will be referred to herein as a "defective area/storage capacity ratio" or simply a "storage capacity ratio".

In this preferred embodiment, if the storage capacity ratio of permanent defects exceeds 10%, the process advances to Step S28. On the other hand, unless the storage capacity ratio exceeds 10% (i.e., if the answer to the query of the processing step S21 is NO), data is written on the target information layer in Step S22.

On the other hand, if the storage capacity ratio of all sorts of defects has turned out in Step S21 to be greater than 10% (i.e., if the answer to the query of the processing step S21 is YES), then the process advances to Step S23, in which the user is alerted to the necessity of cleaning. Such an alert may be either a voice message or an image with a text message that says "please wipe a fingerprint away from the surface of the optical disc". If the optical disc apparatus includes a cleaning mechanism as will be described later, then the optical disc apparatus may get the optical disc cleaned automatically in that case.

After the optical disc has been cleaned in Step S24, the optical disc is searched for any defects in the next processing step S25. Preferably, it is determined, by reference to the defect information (i.e., defect list) obtained in advance, whether or not a defect is still left, even after the cleaning, at the location of a non-permanent defect such as a fingerprint that has been detected before the cleaning. However, the defect search may also be carried out on either the entire optical disc or a broad range including the location where the defect is present.

Next, in Step S26, defect information about non-permanent defects, which has been obtained in the previous processing step S25 by doing the defect search on the optical disc, is recorded on the optical disc to update the old one.

Then, in Step S27, it is determined, by calculation, whether or not the ratio of the combined area of all sorts of defects to the overall data storage area (i.e., user data area) exceeds a predetermined value (of 10%, for example). Unless this storage capacity ratio exceeds 10% (i.e., if the answer to the query of the processing step S27 is NO), data is written on the target information layer in Step S22.

On the other hand, if the storage capacity ratio of the defects has turned out in Step S27 to be greater than 10% (i.e., if the answer to the query of the processing step S27 is YES), the process advances to Step S28 to prohibit the user from writing data on that information layer. And if the given optical disc is a multilayer optical disc, the process advances to the processing step S29 of writing data on another information layer. In that case, the same series of processing steps S20 through S29 will be carried out on that another information layer all over again.

In the example described above, the reference value for rating the storage capacity ratio of defects is supposed to be 10%. However, the present invention is in no way limited to that specific preferred embodiment. Alternatively, an effective storage capacity may be calculated by subtracting the storage capacity to be wasted in vain by the defects from the overall storage capacity of the target information layer and may be compared to the size of the AV data to be written. And if the effective storage capacity of the information layer is found short of the size of the AV data to be written, cleaning may be carried out. If the effective storage capacity of the information layer is still short of the size of the AV data to be written, then the AV data will not be written on that information layer but on another information layer.

Embodiment 3

In a third specific preferred embodiment of the present invention, the types of write processing to perform are changed depending on whether the data to be written on the given optical disc is an AV file (i.e., data that should be written in real time) or a PC file (i.e., data that does not have to be written in real time).

Specifically, if the data to be written is a PC file that does not have to be written in real time, it is possible to attempt writing such data even on an area with some defect unless the defect would make it very difficult to access that area as in the case of a bubble. This is because data could be written on such a defective area anyway. On top of that, even if the attempt to write that data failed, the user could still take his or her time to find another area to write it on. In writing an AV file that should be written in real time, however, such write failures is preferably avoided as perfectly as possible. For that reason, in writing an AV file, it is preferred that the data be written with every defect detected avoided.

This preferred embodiment is characterized by performing an appropriate type of processing adaptively according to the type of the data to be written with the type of defects on the defect list taken into account.

Hereinafter, the third preferred embodiment of the present invention will be described with reference to FIGS. 16 through 19B.

In this preferred embodiment, an optical disc apparatus with the configuration shown in FIG. 5 (which will be referred to herein as a "drive") is connected to a controller (not shown), which will be referred to herein as a "host". In starting writing data, the host sends a write command to the drive. A different write command is issued depending on whether the data to be written on the given optical disc is an AV file or a PC file. Based on the command given by the host, the drive can determine whether the data to be written is an AV file or a PC file.

First of all, it will be described what if the data to be written is a PC file.

In the case of a PC file, the drive converts logical addresses into physical ones by reference to either permanent defects on the defect list or a list of permanent defects. More specifically, the drive extracts the logical addresses except some of the physical addresses that are associated with the areas with permanent defects (including bubbles and scratches).

FIG. 16 shows an exemplary defect list. In writing a PC file, the user is prohibited from writing data on areas with (permanent) defects, which are checked with open circles ○ in the "PC file writing" column of the defect list shown in FIG. 16. In writing an AV file, on the other hand, the user is prohibited from writing data on areas with (permanent and non-permanent) defects, which are checked with open circles ○ in the "AV file writing" column of this defect list.

In this preferred embodiment, physical addresses are extracted from all areas but the defective ones that are checked off with open circles ○ in this table. Thus, in writing a PC file, even on a defective area on this defect list, data can still be written if the defective area is checked off with a cross x, which means that that is an area with a non-permanent defect such as a fingerprint or dust. In writing an AV file, on the other hand, no data may be written on any defective area with any type of defect (i.e., no matter whether the defect is a permanent defect or a non-permanent defect) on the defect list as will be described later.

Next, look at FIG. 17, which is a table summarizing how the drive will operate in response to a command that has been sent from the host to the drive in writing a PC file. In this table, #1 through #18 denote the processing steps to be performed by the host and the drive. The bigger the number, the later the processing step denoted by that number needs to be carried out.

As shown in FIG. 17, first of all, the host issues a PC file write command for File #1 including PC data to be written. On receiving this command, the drive converts logical addresses into physical ones by reference to either permanent defects on the defect list or a list of permanent defects. More specifically, the drive extracts the logical addresses except some of the physical addresses that are associated with the areas with permanent defects (including bubbles and scratches). Next, the drive seeks for the location with a writing start address, which is specified with the physical address, accesses that location, and starts writing from that location. When the drive finishes writing the PC file, the host will issue a PC verify command and give it to the drive. In response to that verify command, the drive goes back to the location with the writing start address again in that area on which the file has just been written and starts a verification process. When the verification process is completed, the host enters a PC file write command for the next data to be written (i.e., File #2) into the drive.

Suppose a tracking error has occurred while the drive is accessing the location with the next writing start address and writing data there. In that case, the host instructs the drive to write the data on a replacement area instead for the purpose of recovery. In response, the drive temporarily stores the address where the error has occurred, accesses the location with the replacement writing start address, and starts writing data there.

When the drive finishes writing the PC file (i.e., File #2), the host issues a PC verify command. In response, the drive accesses the location with the writing start address and starts a verification process there. The drive also performs the verification process even on the replacement area.

When the verification process is completed, the host decides that everything has been written successfully and sends a turn OFF command to the drive. In response, the drive accesses the location with an error generation address and carries out a defect search on it. Suppose the defect has turned out to be a fingerprint as a result of the defect search. In that case, the drive adds information about the fingerprint to the defect list on the optical disc and notifies the host that the processing has been completed successfully. Then, the host enters either a READY state or a turned OFF state.

Next, it will be described with reference to FIG. 18 what if the data to be written is an AV file. The table shown in FIG. 18 corresponds to the one shown in FIG. 17.

In writing an AV file, the host issues an AV file write command. On receiving this command, the drive converts logical addresses into physical ones while avoiding every defect by reference to the defect list. Specifically, the drive extracts logical addresses except not only some of the physical addresses associated with areas with permanent defects (including bubbles and scratches) but also other addresses associated with areas with all the other sorts of defects including non-permanent defects.

Next, the drive seeks for the location with a writing start address, which is specified with the physical address, and starts writing from that location. When the drive finishes writing the AV file (i.e., File #1), the host enters an AV file write command for the next data to be written (i.e., File #2) into the drive. Suppose a tracking error has occurred while the drive is accessing the location with the next writing start address and writing data there. In that case, the host instructs the drive to perform a "slip write operation" immediately. In response to that instruction, the drive continues the write operation with defective sectors skipped.

After having written the AV file, the drive goes back to the location with the address where the error has occurred and starts performing a defect search from a location, of which the address is smaller than the former address by a predetermined capacity. Suppose the defect has turned out to be a fingerprint as a result of the defect search. In that case, the drive adds information about the fingerprint to the defect list on the optical disc and notifies the host that the processing has been completed successfully. Then, the host enters either a READY state or a turned OFF state.

As described above, according to this preferred embodiment, depending on whether the data to be written on the optical disc is a PC file or an AV file, the type of the defects on the defect list that will prohibit the user from writing data on any area with them is selected by a different standard. As a result, when an AV file needs to be written in real time, every defect can be avoided safely. When a PC file is going to be written, on the other hand, the storage capacity of the given optical disc can be used as effectively as possible because the write operation can be retried a number of times even if a write error has occurred.

Figure 19A:
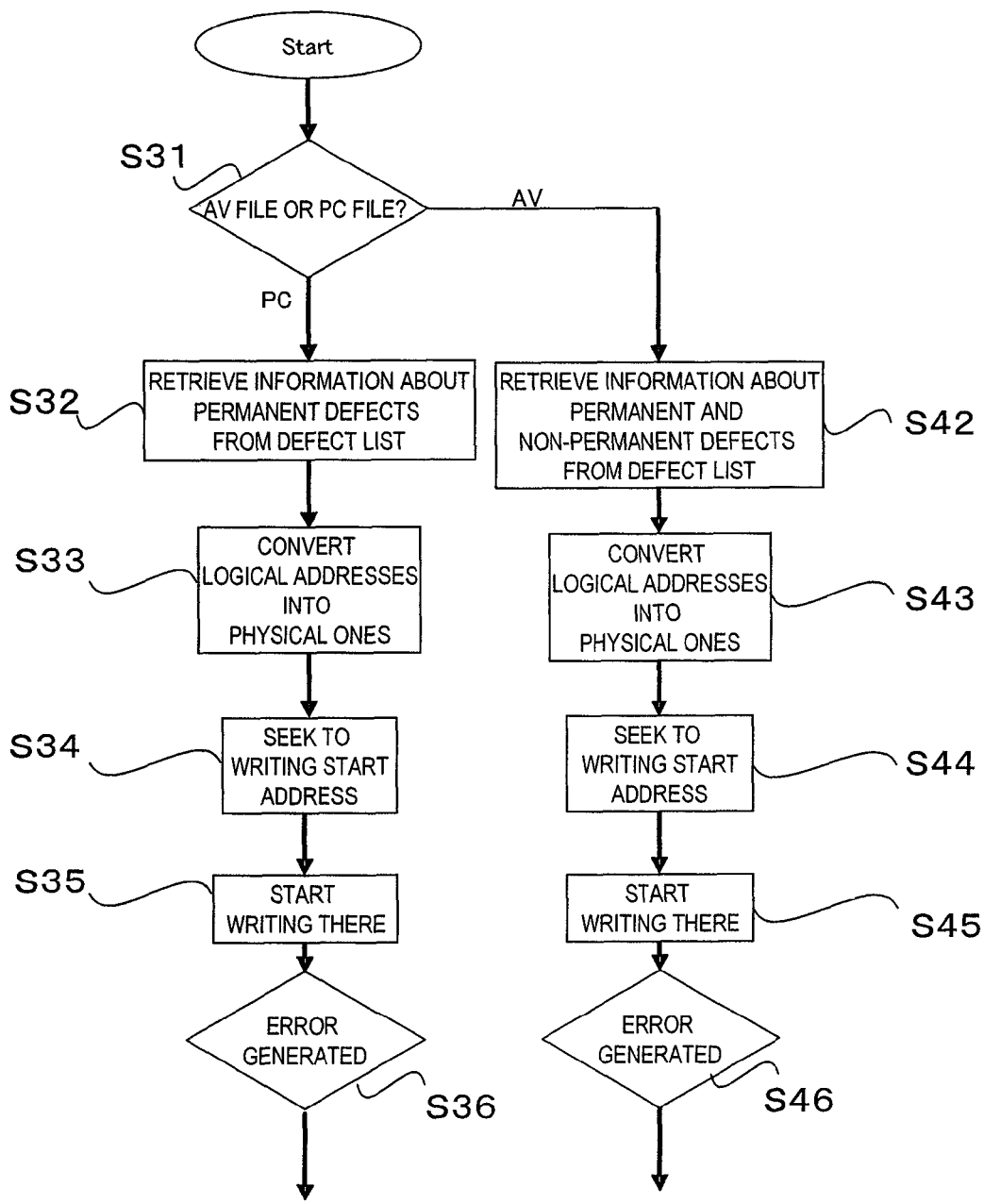
FIG. 19A is a flowchart illustrating a part of the processing to be carried out differently depending on whether the data to be written is a PC file or an AV file.
Figure 19B:
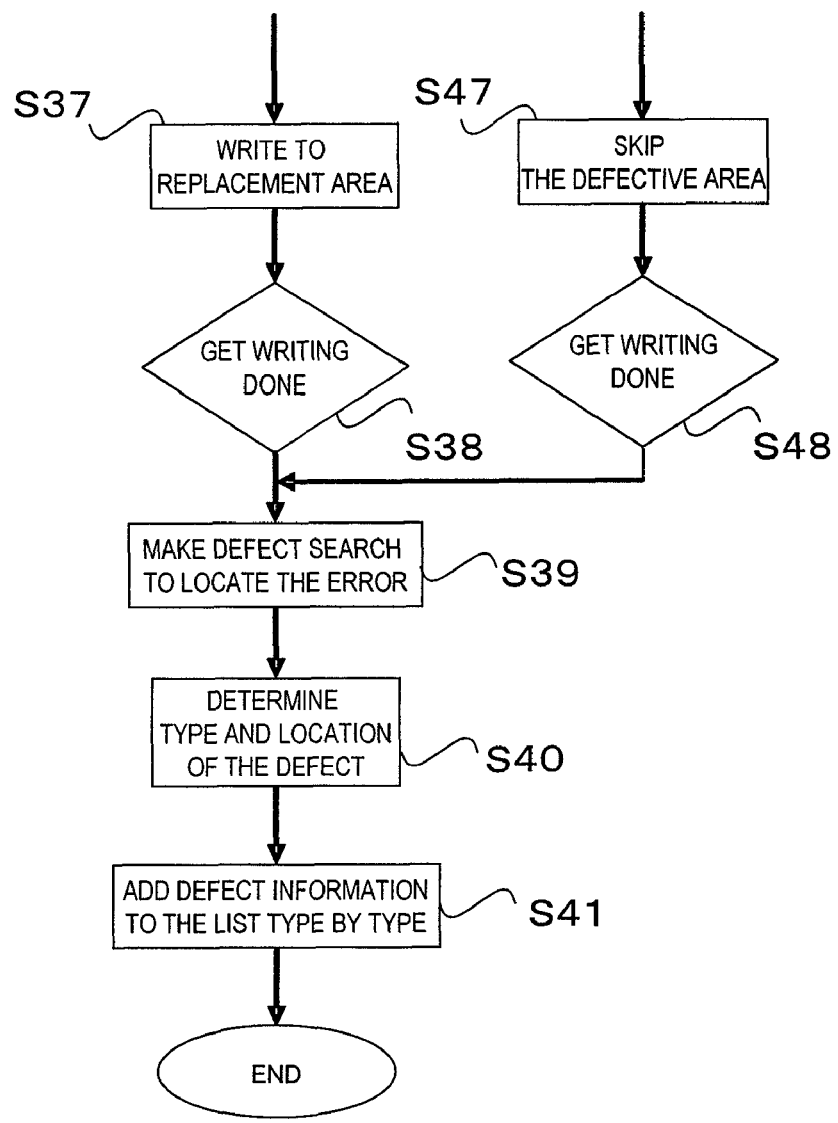
FIG. 19B is a flowchart illustrating the rest of the processing to be carried out differently depending on whether the data to be written is a PC file or an AV file.

Next, look at FIGS. 19A and 19B, which are flowcharts showing part of the operations of the drive described above.

On receiving a writing start command, the drive determines, in Step S31, whether the data to be written is an AV file or a PC file. If what needs to be written is a PC file, the drive retrieves information about the addresses of permanent defects from the defect list in Step S32 and then converts logical addresses into physical ones in Step S33.

Next, the drive seeks for the location with the writing start address in Step S34 and starts writing data there in Step S35. Supposing an error has occurred in Step S36, the drive writes data on a replacement area in Step S37. If the write operation gets done in Step S38, the drive performs a defect search in Step S39 to find what type of defect has been produced at the location where the error has occurred. Then, the drive determines the type and location of the defect in Step S40 and then adds information about the defect to the list on the optical disc.

On the other hand, if the data to be written is an AV file, the process advances from Step S31 to Step S42, in which the drive retrieves information about the addresses of all defects from the defect list. Then, in Step S43, the drive converts logical addresses into physical ones.

Next, the drive seeks for the location with the writing start address in Step S44 and starts writing data there in Step S45. Supposing an error has occurred in Step S46, the drive writes data on the next area in Step S47 while skipping the area where the error has occurred, and then completes the write operation in Step S48.

The optical disc apparatus of this preferred embodiment can be used effectively as a drive for a personal computer that can write both PC and AV files alike.

Embodiment 4

An optical disc apparatus according to this preferred embodiment includes a cleaning mechanism for removing non-permanent defects that are removable.

Portion (a) of FIG. 20 is a plan view illustrating the position of the optical pickup 22 with a defect wiping (cleaner) brush 23 with respect to a removable defect 20 on an optical disc 1. Portion (b) of FIG. 20 is a cross-sectional view schematically illustrating an exemplary configuration of the optical pickup 22.

In the optical pickup 22 of this preferred embodiment shown in portion (a) of FIG. 20, a BD lens 21b and a DVD lens 21a are arranged in this order such that the BD lens 21b is located ahead of the DVD lens 21a in the direction in which the optical disc rotates as indicated by the arrow. The wiping brush 23 is arranged on the other side of the DVD-lens 21a opposite to the BD lens 21b. That is to say, the wiping brush 23 faces the same track (not shown) on the optical disc 1 as the one that the BD lens 21b or the DVD lens 21a faces. It should be noted that the respective tracks on the optical disc 1 run parallel to each other in the direction in which the disc rotates in the vicinity of the optical pickup 22. In this preferred embodiment, the wiping brush 23 is arranged near the BD lens 21b for use to detect a defect. That is why just by performing a seek operation toward the location specified by the address of the defect detected, the wiping brush 23 can be positioned easily.

Optionally, the size, shape and material of the wiping brush 23 may be designed and determined just for the purpose of wiping away nothing but a fingerprint properly. To wipe a defect away, at least a predetermined stress is required. That is why it is effective to form the brush 23 in a roller shape and use a viscous material to make the brush 23 as shown in portion (b) of FIG. 20. Alternatively, the tips of the brush may be rounded or a few pieces of relatively thick cloth may be stacked one upon the other.

The wiping operation is preferably performed for a predetermined amount of time or a predetermined number of times (i.e., with the disc rotated the predetermined number of times) with the focus control suspended once and with the wiping brush 23 brought into contact with the optical disc 1. And when the predetermined amount of time passes, the focus control on the same location is turned ON again and that location is retraced until the sudden steep drop of the RF signal level due to the presence of a fingerprint no longer occurs (i.e., until no signal representing a fingerprint is detected anymore). When it is confirmed that the fingerprint has been wiped away successfully, the cleaner is shifted to the next radial location where another fingerprint or any other defect has been detected. In this manner, the fingerprints and other defects can be removed just as intended and the reliability of the read/write operations can be increased significantly.

Alternatively, the optical disc apparatus may be designed so as to clean the optical disc 1 with the focus servo ON by arranging the wiping brush 23 at the front end of the optical pickup 22 in its traveling direction with respect to the optical disc 1. In that case, no sooner has the optical disc 1 been cleaned a predetermined number of times of rotation than it can be determined, by the level of a fingerprint signal obtained from the RF signal, whether the fingerprint has been wiped away or not.

If the optical disc 1 is cleaned with the focus servo ON in this manner, the vibrations of the wiping brush will be transmitted to the optical disc 1 due to the contact between the brush and the disc, thus causing some disturbance on the focus servo operation. However, since no data should be read or written while the defect is being removed, the focus servo performance (such as the gain) may just be switched into a less sensitive one during the cleaning than during a read/write operation.

For example, if a good phase margin is left, the focus servo failure will rarely occur. In that case, the apparatus will exhibit good responsivity to a disturbance but there will be much steady-state deviation. Even so, as no data is read or written during cleaning, the increase in the steady-state deviation will not be an issue. During the cleaning, the phase margin is preferably increased by making the gain and the operating frequencies lower than the ones during the read/write operation.

Anyway, by arranging the lenses 21a and 21b and the wiping brush 23 together on the base of the optical pickup 22 as described above, automatic cleaning can be done at a reduced cost by integrating those members together with the base and without interfering with the size reduction of the apparatus.

In a preferred embodiment of the present invention, if it has been determined, by reference to the information about non-permanent defects on the defect list that provides type-by-type defect information as shown in FIG. 13, that the number of removable surface defects or the combined area of those defects has exceeded a predetermined value, the cleaning may be started.

If the optical disc apparatus has no cleaning mechanism but if it has been determined that cleaning needs to be done, an alert message such as "please do cleaning" may be posted on the display. If the user has done cleaning, the optical disc apparatus carries out a defect search all over again on the cleaned disc to see if the defect has been removed at least partially. And if the defect has not been removed sufficiently, an alert message that says either "please do cleaning again" or "please replace this disc with another clean disc" may be posted on the display.

Embodiment 5

Figure 21:
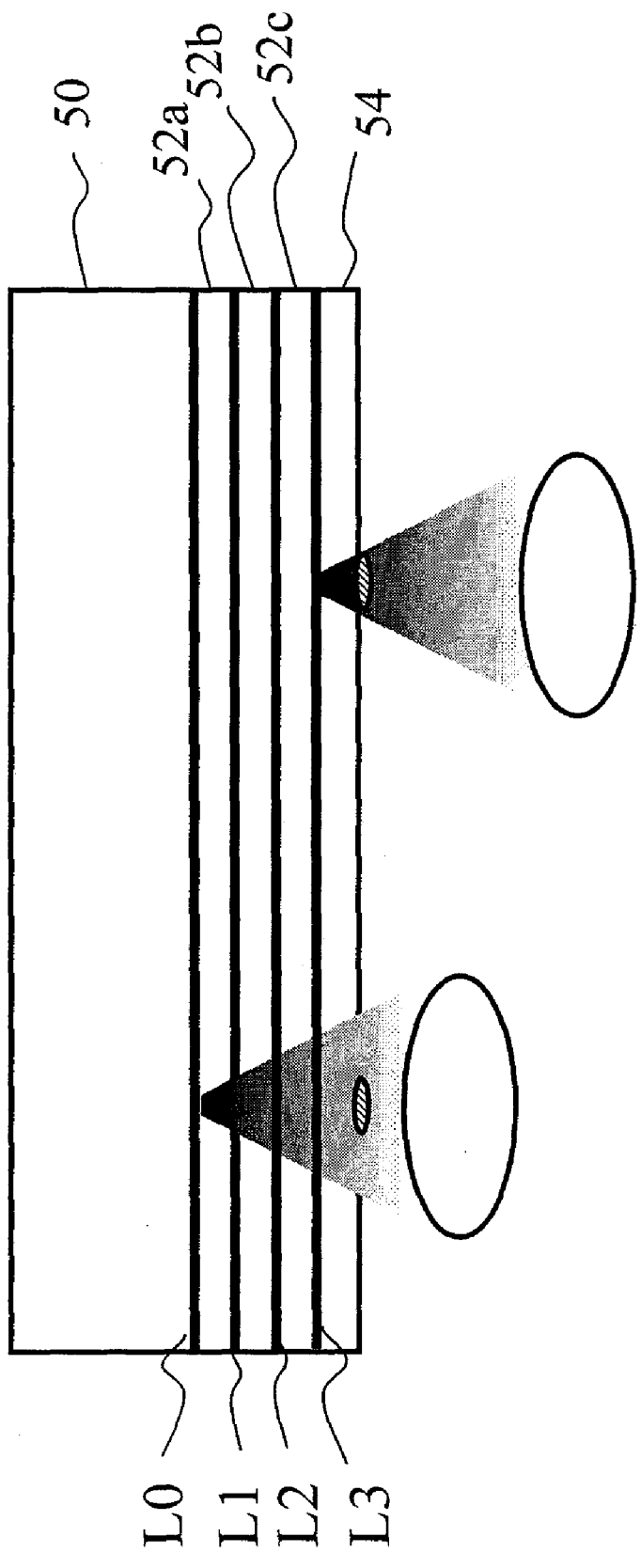
FIG. 21 is a cross-sectional view illustrating a four-layer disc with some defects on its disc surface.

FIG. 21 illustrates a cross section of a multilayer optical disc in which four information layers are stacked one upon the other. On the surface of this disc, there are dust, dirt, fingerprints, scratches and other defects. The ratio of the area of such a surface defect to the cross section of the light beam becomes the smallest when the light beam is focused on the first information layer (L0 layer) that is located at the deepest level and becomes largest when the light beam is focused on the fourth information layer (L3 layer) that is located closest to the disc surface.

The deeper (i.e., the more distant from the disc surface) the information layer is, the smaller the area of a surface defect is.

By reference to the defect list that has been obtained as a result of a defect search, the ratio of the combined planar area of defective areas on each information layer to the overall planar area of the recordable areas on that information layer, i.e., the storage capacity ratio (%), can be calculated.

The following Table 1 shows the types of defects and exemplary storage capacity ratios (%) of defective areas on the respective information layers (L0 through L3):

TABLE 1

|    | Dust | Dirt | Fingerprint | Bubble | Scratch | Total |
|----|------|------|-------------|--------|---------|-------|
| L0 | 1.2  | 0.3  | 1.4         | 5.2    | 2.0     | 10.0  |
| L1 | 1.8  | 0.4  | 2.1         | 5.2    | 2.9     | 12.5  |
| L2 | 2.4  | 0.6  | 2.8         | 5.2    | 3.9     | 14.9  |
| L3 | 3.0  | 0.7  | 3.5         | 5.2    | 4.9     | 17.3  |

As can be seen from Table 1, the closer to the disc surface dust, dirt, a fingerprint or a scratch is located, the higher the storage capacity ratio. On the other hand, as a bubble is an internal defect produced inside an optical disc and affects all of those four information layers almost equally, the storage capacity ratio remains the same irrespective of the depth of the information layer on which the bubble is present.

If the four-layer optical disc with the defects shown in Table 1 gets cleaned to remove its defects, part or all of those surface defects can be removed from the optical disc.

The following Table 2 shows the types of defects that remain even after the disc has been cleaned and exemplary storage capacity ratios (%) of defective areas on the respective information layers (L0 through L3):

TABLE 2

|    | Dust | Dirt | Fingerprint | Bubble | Scratch | Total |
|----|------|------|-------------|--------|---------|-------|
| L0 | 0.0  | 0.0  | 0.0         | 5.2    | 2.0     | 7.2   |
| L1 | 0.0  | 0.0  | 0.0         | 5.2    | 2.9     | 8.1   |
| L2 | 0.0  | 0.0  | 0.0         | 5.2    | 3.9     | 9.1   |
| L3 | 0.0  | 0.0  | 0.0         | 5.2    | 4.9     | 10.1  |

In this example, dust, dirt and fingerprints, which are non-permanent defects, have been completely removed from the disc surface, and therefore, the storage capacity ratios (%) of those non-permanent defects on the respective information layers (L0 through L3) have decreased to 0%. On the other hand, bubbles and scratches that are permanent defects cannot be removed by cleaning and remain even after the cleaning.

If the storage capacity ratio of any of these information layers exceeded 10% due to the presence of defects, that information layer could not achieve the storage capacity expected by the user. In the example shown in Table 2, the storage capacity ratio of permanent defects exceeded 10% on the fourth information layer (L3). In a multilayer optical disc with a sufficiently great number of information layers (which is at least equal to eight and preferably sixteen or more), such an information layer, on which the storage capacity ratio of permanent defects exceeds a reference value, may be regarded as a "defective layer" and the user may be prohibited from writing any data on such a defective layer. Even in that case, however, at least part of that defective layer could be used as a replacement area.

As described above, if there is a bubble as a permanent defect, a tracking error or an abnormal track jump often happens on an information layer that is located close to the bubble. For that reason, as for such an information layer, on which the storage capacity ratio of bubbles exceeds a predetermined value, it is preferred that the user be prohibited from not only writing any data on it but also even accessing it at all. That is to say, such an information layer is preferably both write-protected and non-accessible.

Hereinafter, it will be described how to make such a defective layer write-protected and access-barred. In addition, it will also be described how an optical disc apparatus will operate when loaded with such an optical disc with a defective layer (i.e., how the apparatus operates during the disc loading process).

1. How to Make Defective Layer Write-Protected and Access-Barred

Suppose the ratio of the combined storage capacities wasted by defective areas on a particular one of multiple information layers to the overall data storage capacity of recordable areas on that information layer has turned out to be greater than 10%, for example. In that case, to make that particular information layer Lx write-protected and access-barred, the optical disc of this preferred embodiment has an area to store information for controlling the write-protected and access-barred status of each information layer. Such a piece of information for controlling the write-protected and access-barred status on an information layer basis is sometimes called a "write protect bit" but will be represented herein by a "write/access protect flag (WAPF)", which may be data of two bits, for example. In that case, the flag bits may be allocated so that WAPF=00 means "read/write enabled", WAPF=01 means "write-protected" and WAPF=10 means "access-barred".

According to a conventional technique for getting the entire optical disc write-protected, there is no need to control the access-barred status. On the other hand, according to this preferred embodiment, the write-protected status is controlled on an information layer basis, and therefore, it is possible to make a particular information layer logically invisible to the host by getting it not only write-protected but also read-protected (i.e., barring access to that information layer itself). Among other things, a bubble or a deep scratch will have considerable influence on a TE signal and is likely to cause an abnormal track jump. That is why it would be effective to bar access to a particular information layer to be affected by a bubble. In the following description, the write-protected and access-barred statuses will be collectively referred to herein as "write/access-protected" statuses.

The area to store the WAPF is preferably defined either on the most easily accessible information layer or at some location of an information layer that needs to be always accessed.

Figure 22:
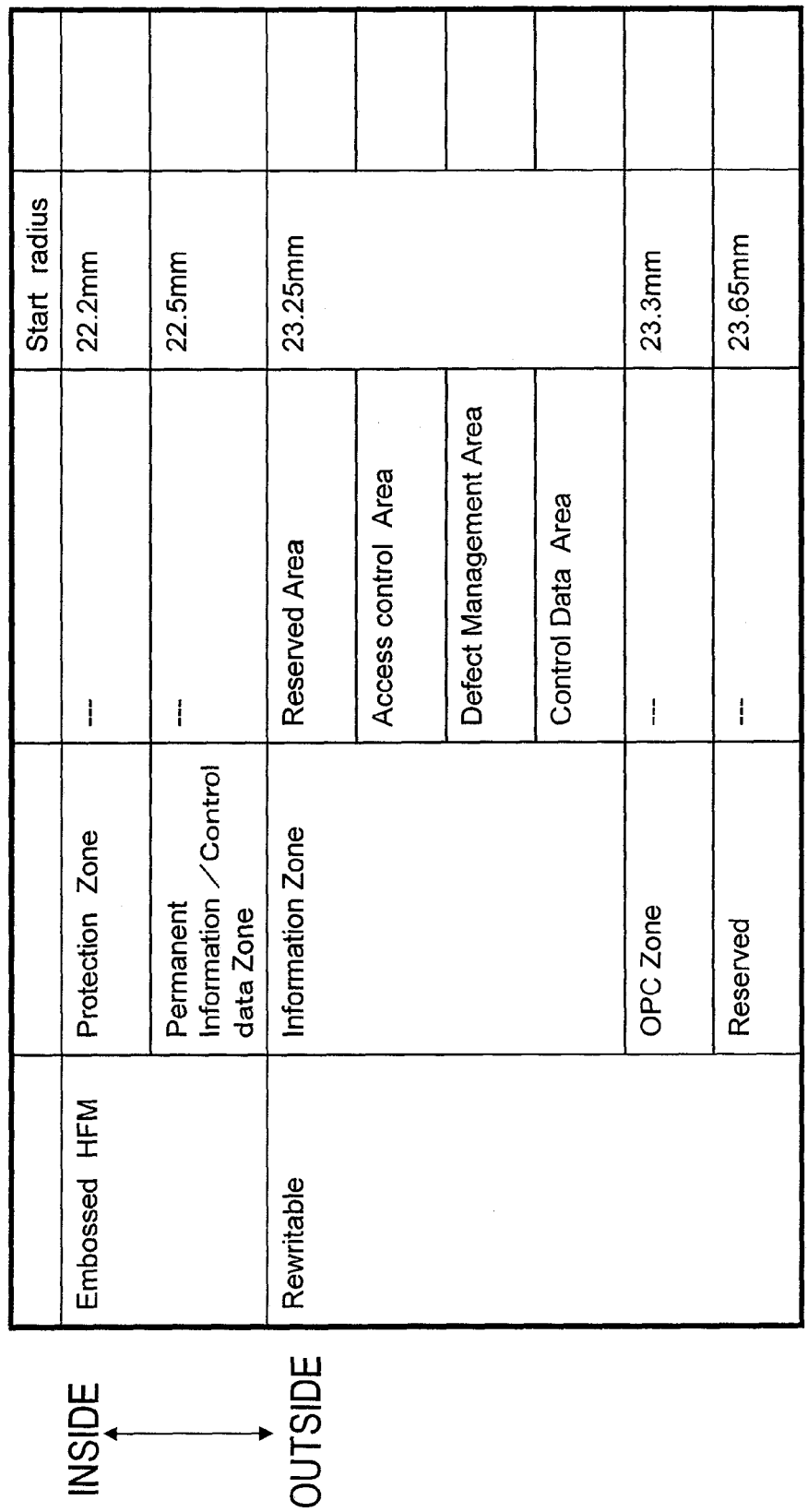
FIG. 22 schematically shows the arrangement of the innermost area (in the radial range of 22.2 mm to 23.65 mm) of the first information layer (L0) that is located more distant from the disc surface than any other one of multiple information layers of a multilayer BD.

FIG. 22 is a table schematically showing the arrangement of the innermost area (that ranges from a radius of 22.2 mm to a radius of 23.65 mm) of the first information layer (L0), which is located at a deeper level under the disc surface than any other one of multiple information layers that a multilayer BD has.

This innermost area has "protection zone", "permanent information/control data zone", "information zone", "OPC zone" and "reserved". Specifically, on the protection zone, stored are fundamental information about the optical disc, including BOOK type, capacity (i.e., storage capacity), and the number of information storage layers included physically, and information specific to the manufacturing lot of the optical disc such as the manufacturer's name and the date, line and place of manufacture. On the permanent information/control data zone, stored is optical disc control related permanent information to be determined by the property of the recording film or the disc substrate (such as recommended writing condition for the optical disc). On the information zone, stored is information about the write-protected status, type-by-type defect list, and DMA related information such as replacement sectors registered. On the OPC zone, a test write operation is performed to adjust the recording power and write strategy by that test writing. And the reserved area is an area on which expansion information that could be needed in the future for a multilayer disc is written as additional information.

The information for controlling the write-protected status on an information layer basis may be stored in the access control area of the information zone. FIG. 23 shows the arrangement of the access control area. As shown in FIG. 23, the access control area includes an area on which its ID (type) is written to indicate that it is rewritable, write-once, or read-only, an area to store the number of times of update (i.e., how many times the information in the access control area has been updated) and an area to store WAPF for the respective information layers. In this area, L0WAPF through L31WAPF denote the deepest information layer L0 through the shallowest information layer L31. In the example illustrated in FIG. 23, any of "00", "01" and "10" bits is assigned to each of L0WAPF through L31WAPF.

If writing or reading data (i.e., gaining access) to/from only a local area of a particular information layer, not the entire layer, needs to be prohibited, "11" may be assigned to such a "partially protected" information layer. In that case, information to locate such an area of the partially protected information layer, on which reading or writing is prohibited, needs to be stored on the optical disc. Such additional information could be stored on the reserved area shown in FIG. 22, for example. Also, if the number of bits of the information assigned to L0WAPF through L31WAPF is defined to be more than three, then information to locate such a read/write-disabled area could be represented by more than three bits. On a BD, each information layer is divided into zones, each of which has a storage capacity of 1 GB. Optionally, on each information layer, the write/access protected status may be controlled on a zone-by-zone basis.

It should be noted that the areas on which the number of times of update and the WAPFs are stored are parts of a rewritable management area.

In this preferred embodiment, if the defective areas on the information layer L1 have a storage capacity ratio of 10% to less than 25%, L1WAPF is set to be "01". On the other hand, if an abnormal track jump has occurred during a defect search to prevent the defect search from coming to an normal end or if the storage capacity ratio of bubbles has turned out to be 25% or more, for example, then access to that information layer may be barred. For example, if the information layer L15 has a storage capacity ratio of 25% or more, then L15WAPF may be set to be "10".

In a situation where the "write/access protect" information about each information layer is stored on the management area of the information layer L0, if the storage capacity ratio of defects on the information layer L0 were 10% or more, then reading or writing data from/on the information layer L0 would be prohibited. In that case, the layer-by-layer write/access protect information could not be written as additional information, which is a problem.

To overcome such a problem, the "write/access protect" information may be stored on a BCA. FIGS. 24(*a*) and 24(*b*) are plan views illustrating exemplary arrangements of BCAs on a multilayer BD. A normal BD has an area called "BCA" in a radial range of 21.0 mm to 22.2 mm on the optical disc (which will be referred to herein as "BCA1"). In this case, "BCA" stands for burst cutting area. On a multilayer BD according to this preferred embodiment, in order to control the write-protected or access-barred status on an information layer basis, a BCA write-once area (BCA2) is arranged as shown in FIG. 24(*a*). This BCA2 is located inside of a normal BCA1, specifically, in a radial range of 20.0 mm through 21.0 mm. An optical disc apparatus that is compatible with a multilayer BD can access a radial location of 20.0 mm (i.e., irradiate it with a light beam) by adjusting the location of the inner traverse switch or mechanical stopper.

In another multilayer BD shown in FIG. 24(*b*), a half (i.e., a half round) of the radial range of 21.0 mm to 22.2 mm on the optical disc is the conventional BCA1 and the rest is BCA2.

This BCA2 has the same arrangement as the access control area shown in FIG. 23. If defects have turned out to account for 10% or more of the information layer L1 as a result of the defect search, L1WAPF of BCA2 is set to be "01". In the same way, if defects account for 10% or more of the information layer L15, then L15WAPF is set to be "01".

A BCA may be formed on a BD by modulating the intensity of a light beam that irradiates the innermost area of the optical disc during initialization. That is why the BCA may be formed (or recorded) on any information layer. However, to make a multilayer BD compatible with a single-layer BD or a dual-layer BD, the BCA is preferably formed on the L0 layer that is the deepest layer in the optical disc. This is because as a BCA is also arranged on the deepest layer L0 of a single-layer or dual-layer BD, every known optical disc apparatus is controlled to always access the deepest layer L0 and scan the BCA on the L0 layer when loaded with a single-layer BD or a dual-layer BD.

Suppose the optical disc apparatus has been loaded with an optical disc, in which access to the L8 layer is barred according to the information stored on the BCA. In that case, with the BCA arranged on the L0 layer, even if the L15 layer should be accessed after required information has been retrieved from the BCA, a focus jump can be carried out with the L8 layer skipped. As a result, unnecessary learning and errors due to access failures can be eliminated.

However, if a barcode BCA is formed by subjecting a metal film on the surface of an optical disc to a laser cutting process, the following advantages are achieved. Specifically, if the light beam is focused on either the surface of the optical disc or an information layer that is located close to the surface, information stored in the BCA on the disc surface can be retrieved. This is because as the cut portions of the barcode BCA have a sufficiently broad width, a variation in reflected light intensity caused by the BCA can be sensed even if the light beam is not focused on the BCA. If an optical disc with such a BCA has been loaded into an optical disc apparatus, a sequence in which the BCA is accessed with the focal point set on the shallowest information layer first is preferably adopted. Then, the information layer that should not be accessed can be recognized earlier than anything else, and therefore, focus jump failures and collision between the pickup and the lens can be avoided.

Since the access control area is a rewritable area, the optical disc apparatus can write information on it easily. On the other hand, as modulation needs to be done during initialization to write information on the BCA2 area, a special type of apparatus should be used to do that.

Methods for writing the write/access protect information will be described. Those methods for writing the write/access protect information are roughly classifiable into the following four:
1) get a defect search performed by the manufacturer of the disc using a shipment testing apparatus and add the information to the access control area;
2) get a defect search performed by the manufacturer of the disc using a shipment testing apparatus and add the information to the BCA2 area;
3) get a defect search done using an optical disc drive and add the information to the access control area; and
4) get a defect search done using an optical disc drive and add the information to the BCA2 area.

No matter whether the defect search is done by the manufacturer of the disc or using an optical disc drive, the methods 1) and 3) and the methods 2) and 4) can be performed in basically the same way, although their scale and intended use of the apparatus are different. Also, it is a usual practice that the manufacturer of optical discs modifies a drive and throws it into a testing process. That is why the situation 2) where a defect search is performed by the manufacturer of the disc using a shipment testing apparatus and the information is added to the BCA2 area and the situation 1) where a defect search is performed by the manufacturer of the disc and the access control area is updated will be described as preferred embodiments.

Figure 25:
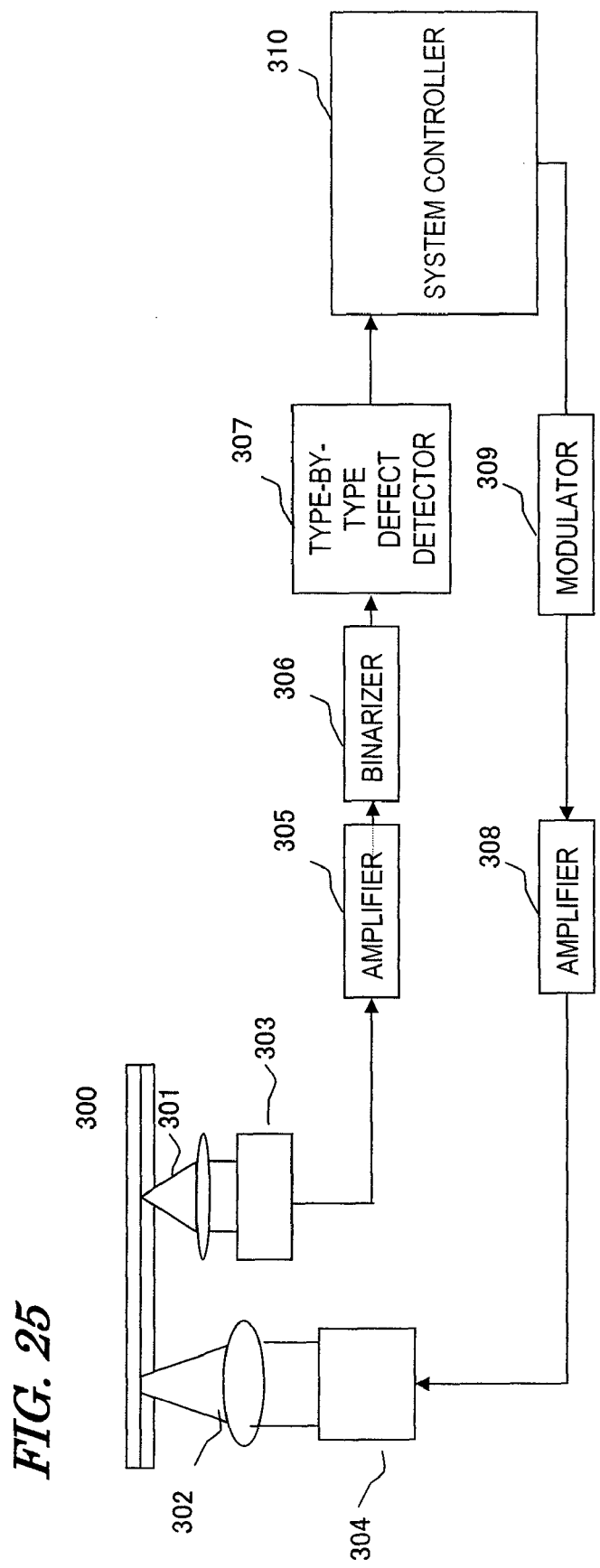
FIG. 25 is a block diagram illustrating an exemplary configuration for a testing apparatus used by disc manufacturers.

First of all, the situation 2) where a defect search is performed by the manufacturer of the disc using a shipment testing apparatus and the information is added to the BCA2 area will be described. FIG. 25 is a block diagram illustrating a configuration for a testing apparatus to be used by a disc manufacturer.

The testing apparatus shown in FIG. 25 includes an initializing pickup 304 that generates an initializing light beam 302 and a read/write pickup 303 that generates a light beam 301 for tentatively writing data on an optical disc and reading data from the optical disc. The initialization is carried out by irradiating an optical disc with a light beam, which is thicker than the one for use to perform a normal read/write operation, with erase power (i.e., an initializing signal at a steady level). In this manner, the entire information layer can be turned into a recordable state with stability. By modulating this initializing signal, a signal with a barcode-like concentration pattern can be written on the BCA area in a radial range of 21.0 mm to 22.2 mm.

The TE and AS signals obtained by the read/write pickup 303 shown in FIG. 25 are amplified appropriately by an amplifier 305, binarized by a binarizer 306, and then supplied to a type-by-type defect detector 307. While fingerprints, bubbles, dust and other defects are detected on a type-by-type basis from an information layer being subjected to the defect search as already described for the first preferred embodiment, tracks are scanned either one by one or every few tracks. When the defect search is done on one whole information layer, the test beam is shifted to the next layer to start a defect search on that layer. And when the defect search gets done on every information layer in this manner, the defect information collected will be supplied to a system controller 310 and recorded on a predetermined defect management area (e.g., the type-by-type defect registering area 5 shown in FIG. 13) on the disc. Also, if a big defect with a storage capacity ratio of 10% or more has been detected from the information layer L1 or L15, for example, the system controller gets the initializing pickup 304 driven by the modulator 309 and the amplifier 308 and moved to an even inner radial location of 20.0 mm, modulates the initializing signal, and adds information to the BCA2 area with the information layer L1 or L15 write-protected.

Information can be retrieved from a BCA in a relatively early stage of the loading process of an optical disc apparatus. That is why if information is retrieved from the BCA2 area during the loading process of the optical disc apparatus, it can be determined exactly which information layer of the optical disc loaded is write-protected.

Next, the situation 1) where a defect search is performed by the manufacturer of the disc and the information in the access control area is updated will be described.

In the access control area of the optical disc (see FIG. 23), the write/access protect information of two bits is stored on an information layer basis. That is why when an optical disc drive is loaded with the optical disc, a defect search is preferably carried out on the disc and the information in the access control area is preferably updated.

The defect search for the purpose of update is started on the deepest information layer L0 in the optical disc, and the tracks are scanned either one by one or every few tracks while fingerprints, bubbles, dust and other defects are being detected as already described for the first preferred embodiment. When the defect search is done on one whole information layer, the test beam is shifted to the next information layer, where the defect search is started all over again.

When the defect search is done on every layer, the defect information is checked by the system controller 630 shown in FIG. 5 and then newly recorded in a predetermined defect management area on the optical disc (e.g., the type-by-type defect registering area 5 shown in FIG. 13). In this case, defects may have increased their number or non-permanent defects that have been on the list so far may have disappeared. Also, if any change has been made according to the definition of the WAPF, then the WAPFs are changed.

According to a conventional defect registering method, no matter what type of defect has been produced, whenever a drive error occurs while a read/write operation is performed on an optical disc, the location of the defect spotted is recorded on (or its information is added to) a DMA area. On the other hand, in a preferred embodiment of the present invention, a defect that has been found as a result of a defect search has its information added to the type-by-type defect registering area in the access control area, not the DMA area. However, if an error (such as an abnormal track jump or a verification failure) has occurred while data is being read or written normally, information about the location where the error has occurred could be added as defect location information and the DMA area may be updated as in the conventional technique without recognizing the type of the defect occurred. Even after such defect information has been added to the DMA area as in the conventional technique, the access control area could be updated once the defect search has been done.

2. How Optical Disc Apparatus Operates when Loaded with Optical Disc with Defective Layer (Processing During Disc Loading)

Hereinafter, it will be described how to control a multilayer information optical disc with at least one write-protected information layer.

First of all, it will be described what if defect information is stored in the access control area.

For example, suppose the optical disc apparatus is loaded with a sixteen-layer BD, of which the information layer L1 and L15 are write-protected. In that case, first, the type of the optical disc loaded is recognized to be either a BD or a non-BD by irradiating the optical disc with a BD light beam. If the given optical disc has turned out to be a BD, a focus search operation is carried out with the spherical aberration corrected with respect to the deepest information layer L0. More specifically, the optical pickup is first brought as close to the optical disc as possible and then taken away from the optical disc gradually. When an S-curve is detected for the first time in the focus error signal obtained while the optical pickup is being taken away, the target of the focus control is set on the information layer L0. After having gotten the focus servo operation established on the information layer L0, the optical disc apparatus tries to get a tracking servo operation established. After that, the offset of the focus error signal and the spherical aberration are finely adjusted, and the lens tilt and various servo system parameters, including a servo gain, are adjusted automatically.

Next, a wobble signal is generated by scanning the wobbled tracks of the BD, an address signal that has been pre-formatted as a wobbled waveform on the tracks is read, and the address of the location being irradiated with a light beam now is detected. And with respect to the current location that has been detected in this manner, the light beam is shifted to the permanent information/control data (PIC) zone and the management information that has been fixed on the optical disc is retrieved from the PIC area. This management information includes information about the number of information layers that the optical disc loaded has physically.

Subsequently, the beam spot of the light beam is moved to the access control area, which is located closer to the outer edge of the disc than the PIC zone is. And in the access control area, it is determined which information layer is write-protected and which information layer is access-barred.

Next, it will be described what if the optical disc apparatus is loaded with a BD with four information layers unlike the example described above. Suppose the information layer L1 thereof is write-protected and the information layer L2 thereof is access-barred. In that case, as the information layer L1 is accessible, the optical disc apparatus accesses the information layer L1 and performs various sorts of learning and automatic adjustments (such as servo and PLL controls) that should be done to carry out a read operation. However, no learning for writing is supposed to be performed on the information layer L1.

Also, since access to the information layer L2 is barred, the logical address space that should have been allocated to the information layer L2 is deleted and address conversion and access control are carried out so that the information layers L0 and L3 are accessed continuously with each other. Consequently, this optical disc that has four information layers physically behaves as a dual-layer BD when used for writing, and as a three-layer disc when used for reading, for the host or the user.

Next, it will be described what if defect information is stored in the BCA of the optical disc.

First, the type of the optical disc loaded is recognized to be either a BD or a non-BD by irradiating the optical disc with a BD light beam. If the given optical disc has turned out to be a BD, a focus search operation is carried out with the spherical aberration corrected with respect to the deepest information layer L0. The optical disc apparatus sets the target of focus control on the information layer L0 in the same procedure as described above. After having gotten the focus servo and tracking servo operations established on the information layer L0, the offset of the focus error signal and the spherical aberration are finely adjusted, and the lens tilt and various servo system parameters, including a servo gain, are adjusted automatically.

Next, the beam spot of the light beam is moved to the BCA. Then, the layer-by-layer control information, which is stored as a barcode pattern in the BCA, is retrieved, thereby determining which information layer of the optical disc loaded is write-protected and/or access-barred.

Information is preferably written on the BCA by cutting a metal film on the optical disc with an ultraviolet laser beam or a green laser beam. Optionally, information could be written on a metal film on the surface of the optical disc, not on the recording film of any information layer of the optical disc. If the BCA is arranged either on or near the surface of the optical disc in this manner, information about the write/access protect status can be collected on a layer-by-layer basis before information is retrieved from the deepest information layer L0. That is to say, it is not until the management information added to the BCA has been sensed that the even deeper information layer is accessed. That is why even if there is any access-barred information layer, the problem of focus and tracking errors can still be avoided.

As described above, the optical disc apparatus of the present invention detects removable defects (such as fingerprints, dust and dirt) that have been deposited on the surface of an optical disc and other non-removable defects (such as scratches and bubbles) separately from each other, and then adds their information to the respective defect management areas that are provided for the respective types of defects. Thus, the apparatus can switch the modes processing (including an alert prompting the user to wipe the defect away or change discs or an alert indicating that the disc is write-protected) according to the type of the defect detected. On top of that, when the apparatus confirms that those removable defects have certainly been removed from the disc, those defects registered are deleted from the defect list. That is why even if the number of registered spots with dust has increased so much under a harsh-environment as to cause a shortage of replacement areas, some of the replacement areas already used can be automatically reused easily.

In addition, as for defects to be produced during the manufacturing process of optical discs (such as bubbles), once the bubbles are registered during its testing process, no additional bubbles should be produced while the user is using the disc. That is why the disc can be designed so as to bar his or her access to a portion with those bubbles, and therefore, the apparatus can operate with good stability without causing any abnormal track jumps.

In the preferred embodiments of the present invention described above, an optical disc is supposed to be tested before being shipped. However, the present invention is also applicable to a situation where an optical disc shipped needs to be tested before something is written on it, not before the disc is shipped.

Also, in the preferred embodiments described above, a list of defects registered, including identifiers indicating whether they are permanent defects or not (i.e., defect attribute information) and type-by-type information indicating the specific types of the defects (i.e., defect type recognition information), is supposed to be drawn up and stored in the type-by-type defect registering area 5 of the optical disc. However, not both of these two kinds of information have to be recorded. Alternatively, only the defect type-by-type information may be recorded without storing such identifiers indicating whether they are permanent defects or not, and a list of registered defects may be drawn up and stored on a defect type basis. Still alternatively, only the identifiers indicating whether they are permanent defects or not may be recorded without storing the defect type-by-type information, and a list of registered defects may be drawn up and stored for each of those identifiers.

Furthermore, according to the present invention, in a situation where the optical disc includes N information storage layers (where N is an integer that is equal to or greater than three and preferably four or more and) that are stacked one upon the other, if any of the N information storage layers has permanent defects in at least a predetermined number or in at least a predetermined percentage, no data may be written on such information storage layer(s), having the permanent defects in at least the predetermined number or in at least the predetermined percentage, and the optical disc may be sold as having (N−X) information storage layers. If a user has purchased such an optical disc, he or she does not have to know how many information storage layers are physically included in that optical disc but just needs to know the exact number or overall storage capacity of information storage layers recordable. It is expected that it will be more and more necessary to manufacture multilayer optical discs at a reduced cost. With the multilayer optical disc of the present invention, even if any of its information storage layers had a lot of defects (which are typically bubbles), the disc could still be used as a good product with being disposed of, thus contributing significantly to reducing the manufacturing cost of optical discs.

Industrial Applicability

As described above, according to the present invention, it is determined whether the defect encountered (such as a fingerprint, a bubble or a BDO (dirt)) is a permanent defect or not, thereby storing information about those permanent defects and information about non-permanent defects separately on an optical disc. That is why the present invention contributes to getting appropriate processing done on a defect type basis, and therefore, is applicable to non-BD optical discs such as HD-DVDs.

REFERENCE SIGNS LIST 4 lead-in area
5 drive area
6 first defect management area
7 second defect management area
S1 processing step of making optical disc
S2 processing step of doing surface check on optical disc
S3 processing step of writing defect information on optical disc
S4 processing step of shipping optical disc

The invention claimed is:

1. An optical disc comprising N information storage layers (where N is an integer that is equal to or greater than three and) that are stacked one upon the other,
wherein when any of the N information storage layers has permanent defects in at least a predetermined number or in at least a predetermined percentage, data is prohibited from being written on that information storage layer; the permanent defects including a bubble that has been produced inside the optical disc, and
wherein information identifying that information storage layer, on which data is prohibited from being written, is stored on the optical disc.

2. An optical disc comprising N information storage layers (where N is an integer that is equal to or greater than three and) that are stacked one upon the other,
wherein when any of the N information storage layers has permanent defects in at least a predetermined number or in at least a predetermined percentage and if the number of information storage layer(s) with those permanent defects is X (which is an integer that is equal to or greater than one); the permanent defects including a bubble that has been produced inside the optical disc,
data is prohibited from being written on such information storage layer(s), having the permanent defects in at least the predetermined number or in at least the predetermined percentage, and the optical disc is sold as having (N-X) information storage layers.

3. The optical disc of claim 2, wherein information identifying such information storage layers, on which data is prohibited from being written, is stored either on the surface or the inside of the disc.

4. An optical disc defect registering method comprising the steps of:
  (A) detecting a defect from an optical disc and determining the attribute or type of the defect detected; and
  (B) writing defect attribute information, by which it is determined whether the defect is a permanent defect including a bubble that has been produced inside the optical disc or a non-permanent defect including a fingerprint or dust that is present on the surface of the optical disc, along with defect location information indicating the location of the defect, on the optical disc.

5. The optical disc defect registering method of claim 4, wherein the attribute information is used to determine whether the defect is a permanent defect or a non-permanent defect.

6. The optical disc defect registering method of claim 4, wherein the attribute information includes information indicating the specific type of the defect.

7. The optical disc defect registering method of claim 4, wherein the step (B) includes the steps of:
  if the defect is a non-permanent defect, writing a first kind of defect management information, including a first kind of defect attribute information indicating that the defect is a non-permanent defect, and defect location information indicating the location of the defect on a defect management area of the optical disc; and
  if the defect is a permanent defect, writing a second kind of defect management information, including a second kind of defect attribute information indicating that the defect is a permanent defect, and defect location information indicating the location of the defect on the defect management area of the optical disc.

8. The optical disc defect registering method of claim 7, wherein the second kind of defect management information is non-rewritable.

9. The optical disc defect registering method of claim 4, wherein the step (A) or (B) is performed before the optical disc is shipped.

10. The optical disc defect registering method of claim 4, wherein the step (A) includes recognizing the type of the defect based on a reflected light intensity, a read error rate and a tracking error.

11. An optical disc defect registering method comprising the steps of:
  (A) detecting a defect from an optical disc and determining the attribute or type of the defect detected; and
  (B) writing defect attribute information, by which it is determined whether the defect is a permanent defect or a non-permanent defect, along with defect location information indicating the location of the defect, on the optical disc,
wherein the step (B) includes the steps of:
  if the defect is a non-permanent defect, writing a first kind of defect management information, including a first kind of defect attribute information indicating that the defect is a non-permanent defect, and defect location information indicating the location of the defect on a defect management area of the optical disc; and
  if the defect is a permanent defect, writing a second kind of defect management information, including a second kind of defect attribute information indicating that the defect is a permanent defect, and defect location information indicating the location of the defect on the defect management area of the optical disc,
wherein the optical disc is a write-once optical disc, and
wherein the first kind of defect management information, indicating that the defect is a non-permanent one, is added, but the second kind of defect management information, indicating that the defect is a permanent one, is not added, to a temporary defect list (TDFL) in an update unit of a TDMS.

12. An optical disc data processing method for performing at least one type of processing that are/is writing data on an optical disc and/or reading data from the optical disc,
wherein the optical disc includes a data area and a management area, and
wherein the management area includes a defect management area to store defect attribute information, by which it is determined whether a defect detected from the optical disc is a permanent defect including a bubble that has been produced inside the optical disc or a non-permanent defect including a fingerprint or dust that is present on the surface of the optical disc, and defect location information indicating the location of the defect, and wherein the method comprises the steps of:
retrieving the defect attribute information and the defect location information from the management area; and
performing the at least one type of processing so that a permanent defect, which is present at the location indicated by the defect location information, is avoided.

13. An optical disc apparatus for performing at least one type of processing that are/is writing data on an optical disc and/or reading data from the optical disc,
wherein the optical disc includes a data area and a management area, and
wherein the management area includes a defect management area to store defect attribute information, by which it is determined whether a defect detected from the optical disc is a permanent defect including a bubble that has been produced inside the optical disc or a non-permanent defect including a fingerprint or dust that is present on the surface of the optical disc, and defect location information indicating the location of the defect, and
wherein the apparatus comprises:
an optical pickup for accessing the optical disc optically;
means for getting data read from the optical disc by the optical pickup; and
means for performing the at least one type of processing so that a permanent defect, which is present at the location indicated by the defect location information that has been retrieved from the management area of the optical disc, is avoided.

14. The optical disc apparatus of claim 13, further comprising a cleaning mechanism for removing the non-permanent defects,
wherein if the apparatus has sensed, by reference to the defect attribute information that has been retrieved from the management area of the optical disc, that the optical disc has at least a predetermined number of non-permanent defects, the cleaning mechanism cleans off the non-permanent defects.

15. The optical disc apparatus of claim 13, further comprising a display that displays an alert for the user of the apparatus,
wherein if the apparatus has sensed, by reference to the defect attribute information that has been retrieved from the management area of the optical disc, that the optical disc has at least a predetermined number of non-permanent defects, the apparatus gets an alert prompting the user to remove the non-permanent defects displayed on the display.

16. A system comprising an optical disc apparatus for performing at least one type of processing that are/is writing data on an optical disc and/or reading data from the optical disc,
wherein the optical disc includes a data area and a management area, and
wherein the management area includes a defect management area to store defect attribute information, by which it is determined whether a defect detected from the optical disc is a permanent defect or a non-permanent defect, and defect location information indicating the location of the defect, and
wherein the apparatus comprises:
an optical pickup for accessing the optical disc optically;
means for getting data read from the optical disc by the optical pickup; and means for performing the at least one type of processing so that a permanent defect, which is present at the location indicated by the defect location information that has been retrieved from the management area of the optical disc, is avoided,
the system further comprising means for getting data written on the optical disc by the optical pickup,
wherein in writing audiovisual file data on the optical disc, the data is written on the optical disc so that the permanent and non-permanent defects both are avoided, and
wherein in writing PC file data on the optical disc, the data is written on the optical disc so that the permanent defects are avoided.

* * * * *